United States Patent
Zhang et al.

(10) Patent No.: US 12,206,577 B2
(45) Date of Patent: Jan. 21, 2025

(54) MULTICAST TRAFFIC TRANSMISSION METHOD AND APPARATUS, COMMUNICATION NODE, AND STORAGE MEDIUM

(71) Applicant: ZTE CORPORATION, Shenzhen (CN)

(72) Inventors: Zheng Zhang, Shenzhen (CN); Benchong Xu, Shenzhen (CN); Xiaolong Zhu, Shenzhen (CN); Rusheng Ma, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 17/916,416

(22) PCT Filed: Dec. 10, 2020

(86) PCT No.: PCT/CN2020/135268
§ 371 (c)(1),
(2) Date: Sep. 30, 2022

(87) PCT Pub. No.: WO2021/196717
PCT Pub. Date: Oct. 7, 2021

(65) Prior Publication Data
US 2023/0155932 A1 May 18, 2023

(30) Foreign Application Priority Data
Apr. 3, 2020 (CN) .................. 202010260534.3

(51) Int. Cl.
*H04L 45/00* (2022.01)
*H04L 45/748* (2022.01)

(52) U.S. Cl.
CPC .......... *H04L 45/566* (2013.01); *H04L 45/748* (2013.01)

(58) Field of Classification Search
None
See application file for complete search history.

(56) References Cited

U.S. PATENT DOCUMENTS

| 2019/0097943 | A1 | 3/2019 | Kotalwar et al. |
| 2019/0296922 | A1* | 9/2019 | Dutta ............... H04L 12/1886 |

(Continued)

FOREIGN PATENT DOCUMENTS

| CN | 106572017 A | 4/2017 |
| CN | 108696438 A | 10/2018 |

(Continued)

OTHER PUBLICATIONS

RFC 8279 Technical Spec Multicast Using Bit Index Explicit Replication (BIER), Nov. 2017 IETF (Year: 2017).*

(Continued)

*Primary Examiner* — Chris Parry
*Assistant Examiner* — Abderrahmen Chouat
(74) *Attorney, Agent, or Firm* — Morgan, Lewis & Bockius LLP

(57) ABSTRACT

Provided are a multicast traffic transmission method and apparatus, a communication node and a storage medium. The multicast traffic transmission method includes the following. A first forwarding entry is determined, where the first forwarding entry includes Bit Indexed Explicit Replication (BIER) information of an Autonomous System Border Router (ASBR); multicast traffic is acquired; and the multicast traffic is encapsulated based on the first forwarding entry, and a BIER packet is determined and transmitted.

15 Claims, 7 Drawing Sheets

(56) References Cited

U.S. PATENT DOCUMENTS

| | | | |
|---|---|---|---|
| 2019/0386848 A1* | 12/2019 | Wang | H04L 12/4625 |
| 2019/0386850 A1* | 12/2019 | Zhang | H04L 45/50 |
| 2019/0394055 A1 | 12/2019 | Zhang | |
| 2019/0394059 A1* | 12/2019 | Zhang | H04L 45/16 |
| 2021/0058260 A1* | 2/2021 | Xia | H04L 12/4633 |

FOREIGN PATENT DOCUMENTS

| | | |
|---|---|---|
| CN | 109150730 A | 1/2019 |
| CN | 110460522 A | 11/2019 |
| CN | 110784411 A | 2/2020 |
| WO | WO2019214589 A1 | 11/2019 |

OTHER PUBLICATIONS

International Search Report in Application No. PCT/CN2020/135268, dated Feb. 25, 2021, 4 pages, including English Translation.

Chinese Office Action in Application No. 2020102605343, dated Aug. 9, 2023, 18 pages, including English Translation.

Chinese Search Report in Application No. 2020102605343, dated Aug. 4, 2023, 7 pages, including English Translation.

A. Dolganow; J. Kotalwar; Nokia; E. Rosen, Ed.; Z. Zhang, "Explicit Tracking with Wild Card Routes in Multicast VPN", Internet Engineering Task Force (IETF), ISSN: 2070-1721, pp. 1-21, Feb. 26, 2018.

J. Luo, "The Technology Status and Trend of the Data Network", Information and Communication Technology, Issue 06, pp. 16-21, Dec. 15, 2017.

Extended European Search Report in Application No. 20928727.5, dated Mar. 14, 2024, 13 pages.

Zhang, Z et al.: "Updates on EVPN BUM Procedures; draft-zzhang-bess-evpn-bum-procedure-updates-00.txt", Updates on EVPN BUM Procedures; Draft-Zzhang-Bess-EVPN-BUM-Procedure-Updates-00.txt, Internet Engineering Task Force, IETF; Standardworkingdraft, Internet Society (ISOC) 4, Rue Des Falaises CH-1205 Geneva, Switzerland, Jul. 6, 2015 (Jul. 6, 2015), pp. 1-19.

Zhang, Z et al.: "MVPN/EVPN C-Multicast Routes Enhancements; draft-zzhang-bess-mvpn-evpn-cmcast-enhancements-01.txt", MVPN/EVPN C-Multicast Routes Enhancements; Draft-zzhang-bess-MVPN-EVPN-CMCAST-Enhancements-01.txt; Internet-Draft: Bess, Internet Engineering Task Force, IETF; Standardworkingdraft, Internet Society (No. 1, Mar. 11, 2019 (Mar. 11, 2019), pp. 1-23.

\* cited by examiner

MULTICAST TRAFFIC TRANSMISSION METHOD AND APPARATUS, COMMUNICATION NODE, AND STORAGE MEDIUM

CROSS REFERENCE TO RELATED APPLICATIONS

This is a National Stage Application filed under 35 U.S.C. 371 based on International Patent Application No. PCT/CN2020/135268, filed on Dec. 10, 2020, which claims priority to Chinese Patent Application No. 202010260534.3 filed on Apr. 3, 2020, disclosures of both of which are incorporated herein by reference in their entireties.

TECHNICAL FIELD

The present application relates to the field of communication and, in particular, to a multicast traffic transmission method and apparatus, a communication node and a storage medium.

BACKGROUND

The multicast technology is increasingly widely applied on the Internet, such as applied in multi-party conferences, distance education, telemedicine, network livestreaming, etc. These applications also promote the development and improvement of the multicast technology.

Bit indexed explicit replication (BIER) is a new multicast data forwarding technology. When implementing BIER domain crossing, the BIER technology can only adapt to the cross-domain scene of Option A, but cannot adapt to cross-domain scenes with more application values such as Option B and Option C. The limitation of cross-domain applications will greatly limit the deployment of the BIER technology in practical networks, and the advantages of the BIER technology cannot be fully used to achieve cross-domain multicast traffic transmission.

SUMMARY

The present application provides a multicast traffic transmission method and apparatus, a communication node and a storage medium.

Embodiments of the present application provide a multicast traffic transmission method applied to a first communication node. The multicast traffic transmission method includes the following.

A first forwarding entry is determined, where the first forwarding entry includes bit indexed explicit replication (BIER) information of an autonomous system border router (ASBR); multicast traffic is acquired; and the multicast traffic is encapsulated based on the first forwarding entry, and a BIER packet is determined and transmitted.

The embodiments of the present application further provide a multicast traffic transmission method applied to a second communication node. The multicast traffic transmission method includes the following.

BIER information of an ASBR is sent to a first communication node; a BIER packet sent by the first communication node is acquired, where the BIER packet is determined based on a first forwarding entry, and the first forwarding entry is determined based on the BIER information of the ASBR sent to the first communication node; and the BIER packet is transmitted based on switching information of a BIER forwarding plane of the second communication node and a second forwarding entry.

The embodiments of the present application further provide a multicast traffic transmission method applied to a third communication node. The multicast traffic transmission method includes the following.

BIER information of an ASBR is sent to a second communication node; a BIER packet of the second communication node is acquired, where the BIER packet is transmitted by the second communication node based on switching information of a BIER forwarding plane and a second forwarding entry; and the BIER packet is transmitted according to a second association relationship.

The embodiments of the present application further provide a multicast traffic transmission apparatus configured at a first communication node. The multicast traffic transmission apparatus includes a first determination module, an acquisition module and a second determination module.

The first determination module is configured to determine a first forwarding entry, where the first forwarding entry includes BIER information of an ASBR; the acquisition module is configured to acquire multicast traffic; and the second determination module is configured to encapsulate the multicast traffic based on the first forwarding entry, and determine and transmit a BIER packet.

The embodiments of the present application further provide a multicast traffic transmission apparatus configured at a second communication node. The multicast traffic transmission apparatus includes a sending module, an acquisition module and a transmission module.

The sending module is configured to send BIER information of an ASBR to a first communication node; the acquisition module is configured to acquire a BIER packet sent by the first communication node, where the BIER packet is determined based on a first forwarding entry, and the first forwarding entry is determined based on the BIER information of the ASBR sent to the first communication node; and the transmission module is configured to transmit the BIER packet based on switching information of a BIER forwarding plane of the second communication node and a second forwarding entry.

The embodiments of the present application further provide a multicast traffic transmission apparatus configured at a third communication node. The multicast traffic transmission apparatus includes a sending module, an acquisition module and a transmission module.

The sending module is configured to send BIER information of an ASBR to a second communication node; the acquisition module is configured to acquire a BIER packet of the second communication node, where the BIER packet is transmitted by the second communication node based on switching information of a BIER forwarding plane and a second forwarding entry; and the transmission module is configured to transmit the BIER packet according to a second association relationship.

The embodiments of the present application further provide a communication node.

The communication node includes one or more processors and a storage apparatus configured to store one or more programs. When executed by the one or more processors, the one or more programs cause the one or more processors to implement any method according to the embodiments of the present application.

The embodiments of the present application further provide a storage medium storing a computer program which, when executed by a processor, implements any method according to the embodiments of the present application.

DETAILED DESCRIPTION

Embodiments of the present application are described below in conjunction with drawings.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from those described herein.

Figure 1:
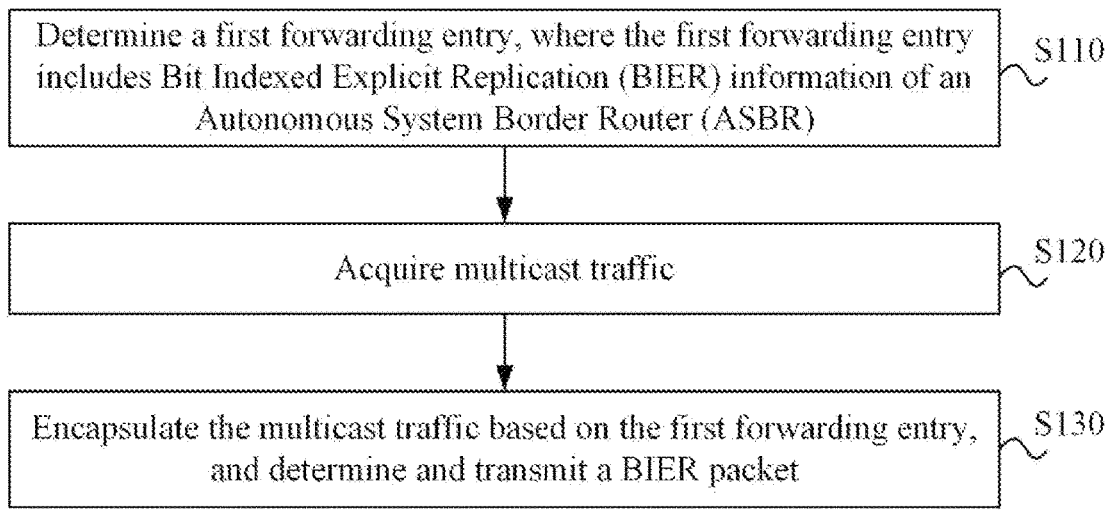
FIG. 1 is a flowchart of a multicast traffic transmission method according to the present application.

In an example implementation, FIG. 1 is a flowchart of a multicast traffic transmission method according to the present application. The method is applicable to a case of performing cross-domain multicast traffic transmission, and the method may be executed by a multicast traffic transmission apparatus configured at a first communication node provided in the present application. The apparatus may be implemented by software and/or hardware and integrated on the first communication node. The first communication node may be an ingress provider edge (PE) of an autonomous system (AS) to which the first communication node belongs. The first communication node may be considered as a communication node directly or indirectly communicating with a server.

Bit Indexed Explicit Replication (BIER) uses one bit for representing nodes at the network edge. Multicast traffic is transmitted in an intermediate network and is additionally encapsulated with a specific BIER header. In this packet header, all destination nodes of the multicast traffic are marked in the form of a bit string; and forwarding nodes of the intermediate network performs routing according to the bit string, so as to ensure that the traffic can be sent to all the destination nodes. An intermediate node forwarding device floods and sends node information in advance through an internal protocol, such as the open shortest path first (OSPF) protocol, the intermediate system-to-intermediate system (ISIS) protocol, the border gateway protocol (BGP) or the Babel routing protocol in a three-layer network, to form a bit index forwarding table (BIFT) for guiding BIER forwarding, and when receiving traffic encapsulated with a BIER header, completes forwarding of a packet to a destination node according to the BIFT. BIER is a data plane forwarding technology not needing to establish a multicast tree, so that the delay in establishing a multicast tree is eliminated. When a problem related to links or nodes occurs on the network, the convergence speed of BIER is the same as the convergence speed of the OSPF protocol and the ISIS protocol, so that the huge delay of originally re-establishing a multicast tree is reduced. The technology for establishing the OSPF/ISIS protocol or the BGP of BIER forwarding entries is referred to as the underlay technology of BIER.

The BIER technology only needs to encapsulate a piece of multicast traffic in a BIER packet as a payload for transmission. An ingress device of a BIER domain, that is, a bit-forwarding ingress router (BFIR), needs to know which egress devices, that is, bit-forwarding egress routers (BFERs), of the BIER domain need this piece of multicast traffic, so that after the BFER receives the piece of multicast traffic, the piece of multicast traffic can be forwarded to a multicast recipient outside the BIER domain which needs to receive the piece of traffic. In addition to using a static configuration manner between the BFIR and the BFER, a protocol running a dynamic advertisement may also be used for letting the BFIR know the BFERs corresponding to a piece of multicast traffic, which is referred to as the overlay technology of BIER. A BIER forwarding table formed on a device within the BIER domain forms a BIER forwarding plane of the domain.

Cross-domain scenes are very common networking scenes in the Internet. The concept of domain crossing comes from a unicast multi-domain backbone network of request for comments (RFC) 4364. The standard of a multicast virtual private network (MVPN) is from RFC 6513. Domain crossing refers to crossing multiple autonomous system (AS) domains. Three cross-domain manners are used. Option A refers to a back-to-back cross-domain manner, where multiple virtual private network (VPN) routing and forwarding (VRF) tables are established between autonomous system border routers (ASBRs), a relationship between a PE and a customer edge (CE) exists between ASBRs, and traffic is restored to private network traffic and then encapsulated on a peer ASBR so as to be delivered on the public network of another AS.

Figure 1A:
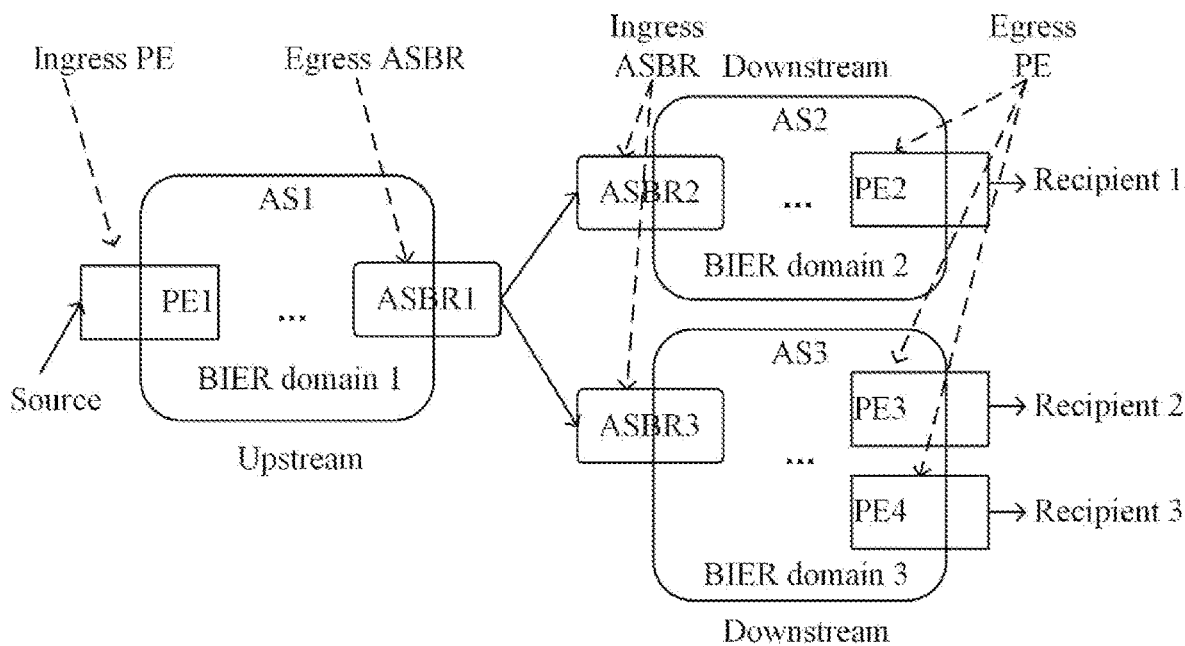
FIG. 1A is a diagram of a cross-domain network according to the present application.

FIG. 1A is a diagram of a cross-domain network according to the present application. As shown in FIG. 1A, when coming out from PE1, traffic is encapsulated according to a public network tunnel; when reaching ASBR1, the traffic is restored to Internet Protocol (IP) traffic of a private network; after sent by ASBR1 to ASBR2 and ASBR3, the IP traffic is re-encapsulated according to the public network tunnel for transmission in AS2. As the simplest cross-domain implementation method, Option A can adapt to a relatively simple cross-domain scene. In this scene, with a solution within the same domain, multicast delivery can be achieved within AS1, AS2 and AS3 by means of the BIER technology. That is, AS1, AS2 and AS3 establish BIER domains of AS1, AS2 and AS3, respectively. PE1 and ASBR1 serve as the BFIR device and the BFER device of AS1, ASBR2 and PE2 serve as the BFIR device and the BFER device of AS2, ASBR3 serves as the BFIR device of AS3, and PE3 and PE4 serve as the BFER devices of AS3. The PE-CE traffic transmission manner is used between ASBRs and is independent of BIER.

Option B is another cross-domain implementation method. In this method, multiple VRF tables are not established between ASBRs for the restoration to private network traffic, and the restoration is implemented by means of re-advertisement of routing between ASBRs. As shown in FIG. 1A, traffic is encapsulated according to a public network tunnel and sent from PE1; when reaching ASBR1, the traffic is directly sent to ASBR2 and ASBR3 in the form of label switching, and ASBR2/ASBR3 then perform label switching and encapsulate tunnels within domains of ASBR2/ASBR3, so that the traffic is sent to recipients of respective ASs of ASBR2/ASBR3. When the BIER technology is applied in this scene, the single-domain BIER technology cannot be directly applied, especially, to traffic processing between ASBRs, and no corresponding technology exists to solve the problem of how to implement BIER forwarding.

Figure 1B:
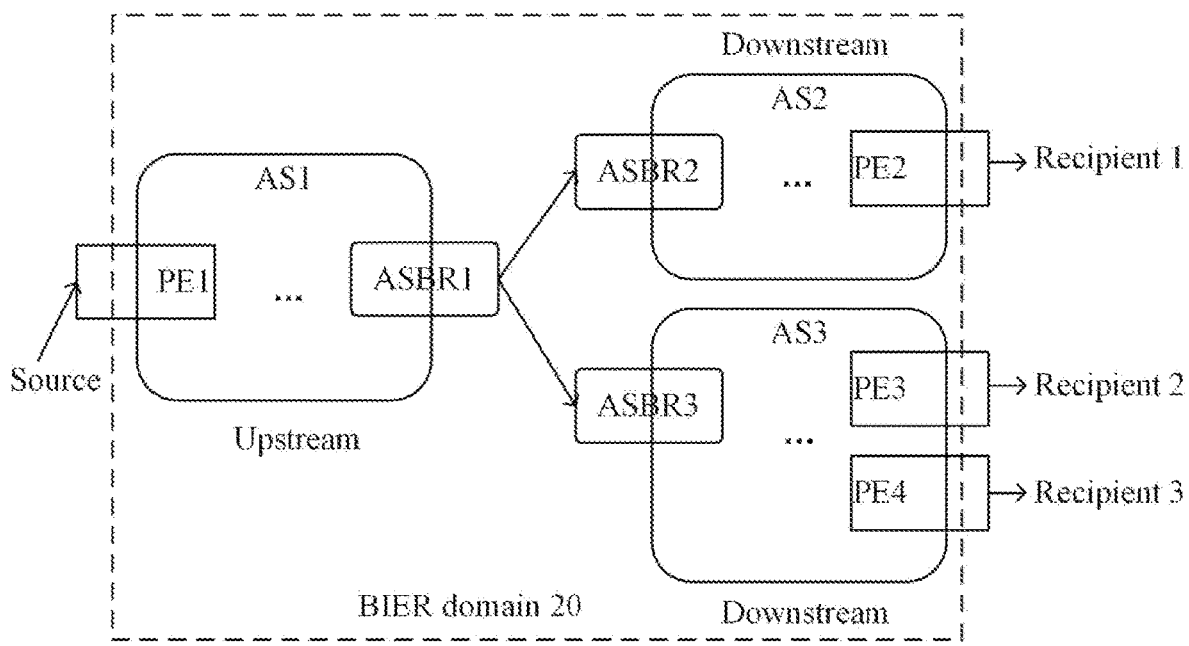
FIG. 1B is a diagram of another cross-domain network according to the present application.

Option C is the third cross-domain implementation method. In this method, the multi-hop external border gateway protocol (EBGP) is established between PEs, but paths crossing multiple ASs need to be opened. When the relevant BIER technology is applied in this scene, the whole network BIER forwarding path can be achieved through routing import of multiple domains. FIG. 1B is a diagram of another cross-domain network according to the present application. Referring to FIG. 1B, ASBR2/ASBR3 need to advertise to ASBR1 routing prefixes of all BFER devices (that is, PE2/PE3/PE4) in the domain and corresponding Bit-Forwarding Router Identifiers (BFR-IDs) one by one or in summary, and ASBR1 completely imports these learned routing prefixes and the corresponding BFR-ID information into the underlay protocol, such as the OSPF protocol, the ISIS protocol and the BGP, of AS1 for establishing a BIER forwarding plane. Thus, a BIER domain, that is, a BIER forwarding plane of the whole network, is established. In this manner, PE1 may directly encapsulate a BIER header with PE2/PE3/PE4 as destination bit strings for the traffic, and the BIER header is sent by the BIER forwarding plane of the whole network to the BFERs, where the BFERs include PE2/PE3/PE4. The intermediate ASBR only implements the forwarding action of a Bit-Forwarding Router (BFR) device to deliver a packet. This implementation method is feasible in a case where the routing of the whole network is completely opened. However, in actual networking, the complete opening of the routing of the whole network cannot be achieved. In this case, the BIER technology still cannot be deployed, and the transmission of multicast traffic cannot be achieved by using the BIER technology.

In RFC 8556, the MVPN is combined with the BIER technology, which is also only applicable to the scene of being within the same domain and cannot support cross-domain scenes.

The definition of a role is given by referring to the state of only a piece of traffic, and in practical applications, roles such as different BFIRs and BFERs and upstream ASs and downstream ASs may exist according to different directions of the traffic, which do not affect the technical description of the present application, and are all within the scope of the present application.

Therefore, in the cross-domain scenes of Option B and Option C, since the relevant BIER technology cannot be directly applied, the deployment of the BIER technology is difficult, and thus the BIER technology cannot be applied on a large scale.

The BIER technology is being widely used on networks, and how to apply the BIER technology to large-scale networking of multiple AS domains is an important problem to be solved. The present application improves the BIER technology for multiple multicast cross-domain scenes, so that the BIER technology can well serve large-scale networks, and the development of the network multicast technology is promoted.

In an example implementation, the present application provides a multicast traffic transmission method as shown in FIG. 1. The method includes the following.

In S110, a first forwarding entry is determined, where the first forwarding entry includes bit indexed explicit replication (BIER) information of an autonomous system border router (ASBR).

The first forwarding entry may be used for encapsulating multicast traffic to obtain a BIER packet. For example, a destination bit string of the multicast traffic is determined based on the first forwarding entry to achieve cross-domain transmission of the multicast traffic. In this step, the first forwarding entry may be established based on the acquired BIER information of the ASBR.

The first forwarding entry may include the BIER information of the ASBR, where the ASBR may be one or more of egress ASBRs of an autonomous system to which a first communication node belongs and ingress ASBRs of an autonomous system downstream of the autonomous system to which the first communication node belongs. The first forwarding entry may further include BIER information of an egress PE or BIER information of an egress ASBR of the autonomous system downstream of the autonomous system to which the first communication node belongs.

In the present application, a BFR-ID of a multi-hop BFER may be acquired, and a multi-level mapping table of the BFR-ID is established, so that the first forwarding entry is obtained. Exemplarily, the first communication node may determine a next-hop device of a fourth communication node in an iteration manner to establish the multi-level mapping table.

In S120, multicast traffic is acquired.

The multicast traffic may be considered as traffic in a multicast scene. The multicast traffic may be transmitted indirectly to the fourth communication node interested in the multicast traffic.

In S130, the multicast traffic is encapsulated based on the first forwarding entry, and a BIER packet is determined and transmitted.

After the multicast traffic is acquired, in the present application, the multicast traffic may be encapsulated to obtain the BIER packet, and then the BIER packet is transmitted.

Before the multicast traffic is encapsulated, one or more of the first communication node, a second communication node, a third communication node and the fourth communication node in the present application, that is, PEs or ASBRs, may predetermine multicast traffic which each fourth communication node is interested in or a VPN to which the multicast traffic belongs, and allocate a label or a segment identifier (SID) to the multicast traffic which each fourth communication node is interested in or the VPN to which the multicast traffic belongs, so that the corresponding multicast traffic or the VPN to which the multicast traffic belongs is identified. After the label or SID is allocated, an association relationship is established at a communication node that requires BIER forwarding plane switching. An association relationship established by the first communication node may include the traffic which the fourth communication node is interested in or the VPN to which the traffic belongs and the corresponding label or SID. For example, the association relationship of the first communication node is established based on the traffic of interest and the corresponding label, or the association relationship of the first communication node is established based on the VPN to which the traffic of interest belongs and the corresponding label.

In this step, when the multicast traffic is encapsulated, an one-layer BIER header or a two-layer BIER header may be obtained by encapsulation based on the first forwarding entry, and BIER packet forwarding is performed in a cross-domain network according to an association relationship, such as a BIER forwarding table and the multi-level mapping table of the BFR-ID. An outer-layer BIER header may be used for indicating a protocol field of an inner-layer BIER header, such as Ethernet, Internet Protocol version 6 (IPv6) or a BIER type.

In an embodiment, whether to perform BIER forwarding plane switching may be determined according to information acquired through the current communication node, for example, determined according to whether a forwarding plane to which the BIER packet belongs when the BIER packet is sent and a forwarding plane when the BIER packet is sent to a next-hop device are the same forwarding plane.

In an embodiment, the association relationship may be established based on received indication information of a communication node for identifying the label of SID sent to the present communication node, the sent label or SID (that is, identification information), the label or SID allocated by the present communication node and indication information of the present communication node.

The "first", "second", "third" and the like in the present application are only used for distinguishing between corresponding contents. Exemplarily, first indication information and second indication information are only used for distinguishing between indication information, where the first indication information may be used for indicating that first identification information is sent by the first communication node; second indication information may be used for indicating that second identification information is sent by the second communication node.

In the present application, the BIER packet may be transmitted through a BIER forwarding plane of the first communication node. In the present application, a BIER domain and a corresponding BIER forwarding plane may be established according to a routing capability of a routing prefix of an ASBR or a routing capability a routing prefix of a PE in other ASs. For example, the BIER forwarding plane of the first communication node is determined based on a routing capability of a third communication node in the autonomous system to which the first communication node belongs. The third communication node may be an ingress ASBR of the autonomous system downstream of the autonomous system to which the first communication node belongs.

According to the multicast traffic transmission method provided in the present application, the first forwarding entry is determined, where the first forwarding entry includes the BIER information of the ASBR; the multicast traffic is acquired; and the multicast traffic is encapsulated based on the first forwarding entry, and the BIER packet is determined and transmitted. Through this method, the application scenes of the BIER technology are enriched, and the application of the BIER technology in large-scale networks is achieved.

Based on the preceding embodiment, variant embodiments of the preceding embodiment are provided. For the brevity of description, only differences from the preceding embodiment are described in the variant embodiments.

In an embodiment, the BIER information of the ASBR includes one or more of: BIER information of a second communication node, where the second communication node is an egress ASBR of an autonomous system to which the first communication node belongs; BIER information of a third communication node, where an autonomous system to which the third communication node belongs is located downstream of an autonomous system to which the first communication node belongs; and BIER information of a fourth communication node, where the fourth communication node is an egress provider edge or an egress ASBR of an autonomous system to which a third communication node belongs.

The ASBR of the autonomous system may be one or more of the second communication node, the third communication node and the fourth communication node. The BIER information is not limited here, and the information required for achieving cross-domain transmission by using the BIER technology may be determined based on actual situations.

In an embodiment, the BIER information includes a bit-forwarding router identifier (BFR-ID), and the BIER information further includes one or more of: Sub-Domain information, a bit index forwarding table identifier and a bit string length.

Exemplarily, the BIER information may include the BFR-ID, and the BFR-ID of a communication node corresponding to the multicast traffic may be set as a destination bit string when the multicast traffic is encapsulated. The communication node corresponding to the multicast traffic may be considered as a communication node interested in the multicast traffic.

The Sub-Domain information may be considered as information used for identifying a BIER domain. In the present application, whether to perform forwarding plane switching may be determined based on the Sub-Domain information, so that the BIER packet is re-encapsulated. For example, when a BIER packet is transmitted and a corresponding BIER domain for receiving the BIER packet and a domain for sending the BIER packet are different domains, forwarding plane switching may be performed.

The application of the Bit Index Forwarding Table Identifier and the Bit String Length is not limited here, and may be set according to actual requirements.

In an embodiment, determining the first forwarding entry includes one or more of the following.

BIER information of a second communication node and BIER information of a third communication node are acquired, and the first forwarding entry is determined based on the BIER information of the second communication node and the BIER information of the third communication node; BIER information of a second communication node is acquired, and the first forwarding entry is determined based on the BIER information of the second communication node; BIER information of a second communication node, BIER information of a third communication node and BIER information of a fourth communication node are acquired, and the first forwarding entry is determined based on the BIER information of the second communication node, the BIER information of the third communication node and the BIER information of the fourth communication node; and BIER information of a second communication node and BIER information of a fourth communication node are acquired, and the first forwarding entry is determined based on the BIER information of the second communication node and the BIER information of the fourth communication node.

In a case where a cross-domain manner is Option B and a routing prefix of the third communication node is routable in the autonomous system to which the first communication node belongs, in the present application, the BIER information of the third communication node may be acquired so that the first forwarding entry is established based on the BIER information of the third communication node. Moreover, in the present application, the BIER information of the second communication node may further be acquired so that the first forwarding entry is established based on the BIER information of the second communication node.

In a case where a cross-domain manner is Option C and a routing prefix of the third communication node is routable in the autonomous system to which the first communication node belongs, in the present application, the BIER information of the third communication node and the BIER information of the fourth communication node may be acquired so that the first forwarding entry is established based on the BIER information of the third communication node and the BIER information of the fourth communication node. Moreover, in the present application, the BIER information of the second communication node may further be acquired so that the first forwarding entry is established based on the BIER information of the second communication node.

In a case where a cross-domain manner is Option B and a routing prefix of the third communication node is non-routable in the autonomous system to which the first communication node belongs, in the present application, the BIER information of the second communication node may be acquired so that the first forwarding entry is established based on the BIER information of the second communication node.

In a case where a cross-domain manner is Option C and a routing prefix of the third communication node is non-routable in the autonomous system to which the first communication node belongs, in the present application, the BIER information of the fourth communication node may be acquired so that the first forwarding entry is established based on the BIER information of the fourth communication node. Moreover, in the present application, the BIER information of the second communication node may further be acquired so that the first forwarding entry is established based on the BIER information of the second communication node.

In an embodiment, transmitting the BIER packet includes the following.

The BIER packet is transmitted through a BIER forwarding plane of the first communication node, where the BIER forwarding plane of the first communication node is determined based on a routing capability of a routing prefix of a third communication node in an autonomous system to which the first communication node belongs.

In the present application, the BIER forwarding plane of the first communication node may be determined based on the routing capability of the routing prefix of the third communication node in the autonomous system to which the first communication node belongs. For example, communication nodes included in the BIER forwarding plane are determined based on the routing capability of the routing prefix of the third communication node in the autonomous system to which the first communication node belongs.

In an embodiment, in a case where the routing prefix of the third communication node is routable in the autonomous system to which the first communication node belongs, the BIER forwarding plane includes a forwarding plane formed after a BIER forwarding plane of the autonomous system to which the first communication node belongs extends onto the third communication node; in a case where the routing prefix of the third communication node is non-routable in the autonomous system to which the first communication node belongs, the BIER forwarding plane includes a forwarding plane formed by the autonomous system to which the first communication node belongs and an autonomous system to which a second communication node belongs.

In the case where the routing prefix of the third communication node is routable in the autonomous system to which the first communication node belongs, the BIER forwarding plane may include a forwarding plane to which the first communication node and the second communication node belong extending onto the third communication node so that the BIER forwarding plane of the first communication node includes the third communication node.

In an embodiment, in a case where the acquired multicast traffic is multicast traffic which a fourth communication node is interested in, a cross-domain manner is Option B, and a routing prefix of a third communication node is routable in an autonomous system to which the first communication node belongs, a destination bit string in a packet header of the BIER packet includes a BFR-ID of the third communication node; in a case where the acquired multicast traffic is multicast traffic which a fourth communication node is interested in, a cross-domain manner is Option C, and a routing prefix of a third communication node is routable in an autonomous system to which the first communication node belongs, two-layer packet header encapsulation is performed on the BIER packet, a destination bit string in an inner-layer BIER header includes a BFR-ID of the fourth communication node, a destination bit string in an outer-layer BIER header includes a BFR-ID of the third communication node, and a protocol field of the outer-layer BIER header is determined according to an encapsulation form of the inner-layer BIER header; in a case where the acquired multicast traffic is multicast traffic which a fourth communication node is interested in, a cross-domain manner is Option B, and a routing prefix of a third communication node is non-routable in an autonomous system to which the first communication node belongs, a destination bit string in a packet header of the BIER packet includes a BFR-ID of a second communication node; in a case where the acquired multicast traffic is multicast traffic which a fourth communication node is interested in, a cross-domain manner is Option C, and a routing prefix of a third communication node is non-routable in an autonomous system to which the first communication node belongs, two-layer packet header encapsulation is performed on the BIER packet, a destination bit string in an inner-layer BIER header includes a BFR-ID of the fourth communication node, a destination bit string in an outer-layer BIER header includes a BFR-ID of a second communication node, and a protocol field of the outer-layer BIER header is determined according to an encapsulation form of the inner-layer BIER header.

In an embodiment, in the case where the acquired multicast traffic is the multicast traffic which the fourth communication node is interested in, the cross-domain manner is Option B, and the routing prefix of the third communication node is routable in the autonomous system to which the first communication node belongs, the first communication node and the third communication node belong to the same forwarding plane, and when the multicast traffic is encapsulated, the destination bit string is set as the BFR-ID of the third communication node.

In an embodiment, in the case where the acquired multicast traffic is the multicast traffic which the fourth communication node is interested in, the cross-domain manner is Option C, and the routing prefix of the third communication node is routable in the autonomous system to which the first communication node belongs, the first communication node knows the BFR-ID of the fourth communication node and the first communication node and the fourth communication node belong to the same forwarding plane, and therefore two-layer packet header encapsulation is performed on the packet. The destination bit string of the inner-layer BIER header is set as the BFR-ID of the fourth communication node, and the destination bit string of the outer-layer BIER header is set as the BFR-ID of the third communication node.

In an embodiment, in the case where the acquired multicast traffic is the multicast traffic which the fourth communication node is interested in, the cross-domain manner is Option B, and the routing prefix of the third communication node is non-routable in the autonomous system to which the first communication node belongs, the first communication node and the third communication node do not belong to the same forwarding plane, and the destination bit string in the header of the BIER packet is set as the BFR-ID of the third communication node.

In an embodiment, in the case where the acquired multicast traffic is the multicast traffic which the fourth communication node is interested in, the cross-domain manner is Option C, and the routing prefix of the third communication node is non-routable in the autonomous system to which the first communication node belongs, the first communication node and the third communication node do not belong to the same forwarding plane and the first communication node knows the BFR-ID of the fourth communication node, and therefore two-layer packet header encapsulation is performed on the packet. The destination bit string of the inner-layer BIER header is set as the BFR-ID of the fourth communication node, and the destination bit string of the outer-layer BIER header is set as the BFR-ID of the second communication node.

In an embodiment, the method further includes the following.

Interest information sent by a receiving node is acquired, where the receiving node is a second communication node or a fourth communication node, and the interest information sent by the receiving node indicates multicast traffic which the fourth communication node is interested in or a virtual private network to which the multicast traffic belongs; and first identification information corresponding to the interest information and first indication information are sent to the receiving node, where the first identification information includes a label or a segment identifier, and the first indication information indicates that the first identification information is sent by the first communication node.

Before the multicast traffic is encapsulated, the interest information sent by the receiving node may further be acquired in the present application.

The first communication node may establish an association relationship of the first communication node based on the first identification information, the interest information and the receiving node, and transmit the BIER packet based on the association relationship. The BIER packet may include the first identification information corresponding to the multicast traffic.

Figure 2:
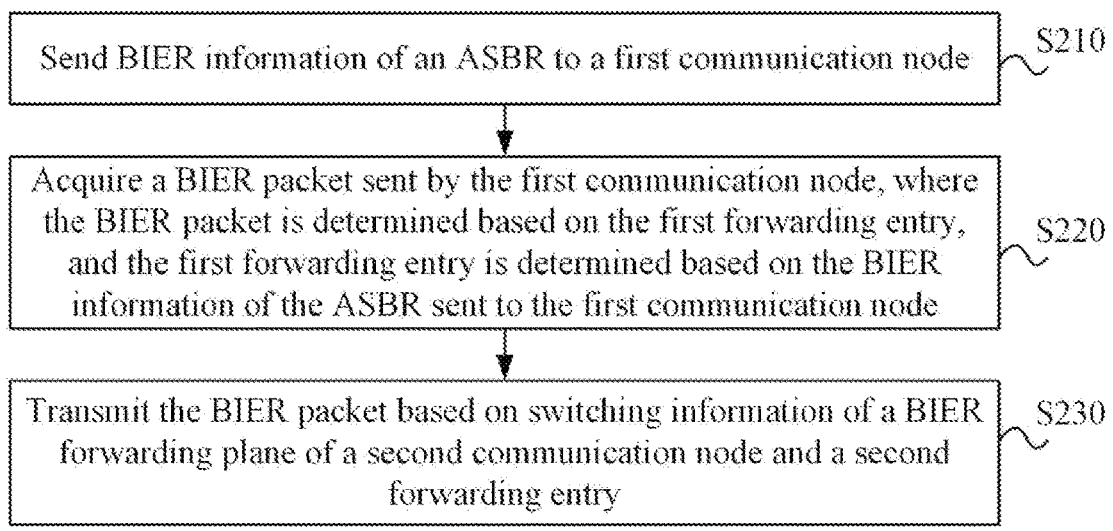
FIG. 2 is a flowchart of another multicast traffic transmission method according to the present application.

In an example implementation, the present application further provides a multicast traffic transmission method. FIG. 2 is a flowchart of another multicast traffic transmission method according to the present application. The method is applicable to a case of performing cross-domain multicast traffic transmission, and the method may be executed by a multicast traffic transmission apparatus configured at a second communication node provided in the present application. The apparatus may be implemented by software/hardware and integrated on the second communication node. The second communication node may be an egress ASBR of an autonomous system to which the second communication node belongs. For the content that is not yet exhaustive in the embodiment, reference may be made to the preceding embodiments, which is not repeated here.

As shown in FIG. 2, the multicast traffic transmission method provided in the embodiment of the present application includes the following.

In step S200, BIER information of an ASBR is sent to a first communication node.

In this step, the BIER information of the ASBR may be sent to the first communication node for the first communication node to determine a first forwarding entry, so as to achieve the transmission of a BIER packet.

In S220, a BIER packet sent by the first communication node is acquired, where the BIER packet is determined based on the first forwarding entry, and the first forwarding entry is determined based on the BIER information of the ASBR sent to the first communication node.

In S230, the BIER packet is transmitted based on switching information of a BIER forwarding plane of a second communication node and a second forwarding entry.

The switching information may indicate whether the second communication node needs to perform BIER forwarding plane switching when transmitting the BIER packet. The switching information may include switching and not switching. The second forwarding entry may be considered as a forwarding entry of the second communication node. The second communication node may transmit or re-encapsulate the BIER packet based on the second forwarding entry.

After the BIER packet is acquired, in this step, whether it is required to perform BIER forwarding plane switching may be determined based on the switching information, and then the manner for transmitting the BIER packet based on the second forwarding entry may be determined based on a determined result. Exemplarily, in a case where the determined result is not switching, in the present application, the BIER packet may be directly forwarded based on the second forwarding entry; in a case where the determined result is switching, in the present application, the BIER packet may be re-encapsulated based on the second forwarding entry, and the re-encapsulated BIER packet is transmitted.

According to the multicast traffic transmission method provided in the present application, the BIER information of the ASBR is sent to the first communication node; the BIER packet sent by the first communication node is acquired, where the BIER packet is determined based on the first forwarding entry, and the first forwarding entry is determined based on the BIER information of the ASBR sent to the first communication node; and the BIER packet is transmitted based on the switching information of the BIER forwarding plane of the second communication node and/or the second forwarding entry. Through this method, the application scenes of the BIER technology are enriched, and the application of the BIER technology in large-scale networks is achieved.

Based on the preceding embodiment, variant embodiments of the preceding embodiment are provided. For the brevity of description, only differences from the preceding embodiment are described in the variant embodiments.

In an embodiment, the BIER information of the ASBR includes one or more of: BIER information of the second communication node and BIER information of a third communication node.

The BIER information of the third communication node may be advertised by the third communication node to the second communication node.

In an embodiment, in a case where a routing prefix of a third communication node is routable in an autonomous system to which the first communication node belongs, the BIER forwarding plane includes a forwarding plane formed after a BIER forwarding plane of the autonomous system to which the first communication node belongs extends onto the third communication node, where the switching information of the BIER forwarding plane of the second communication node is not switching; in a case where a routing prefix of a third communication node is non-routable in an autonomous system to which the first communication node belongs, the BIER forwarding plane includes a forwarding plane formed by the second communication node and the first communication node and a forwarding plane formed by the third communication node and the second communication node, where the switching information of the BIER forwarding plane of the second communication node is switching.

In an embodiment, transmitting the BIER packet based on the switching information of the BIER forwarding plane of the second communication node and the second forwarding entry includes the following.

In a case where the switching information of the BIER forwarding plane of the second communication node is not switching, the BIER packet is forwarded according to a first forwarding sub-entry in the second forwarding entry, where the first forwarding sub-entry is a forwarding entry in a forwarding plane formed after a BIER forwarding plane of an autonomous system to which the first communication node belongs extends onto a third communication node, and the first forwarding sub-entry includes BIER information of the third communication node; in a case where the switching information of the BIER forwarding plane of the second communication node is switching, the BIER packet is received based on a second forwarding sub-entry in the second forwarding entry, the BIER packet is re-encapsulated based on a third forwarding sub-entry in the second forwarding entry, and the re-encapsulated BIER packet is transmitted, where the second forwarding sub-entry is a forwarding entry in a forwarding plane formed by the first communication node and the second communication node, the second forwarding sub-entry includes BIER information of the second communication node, the third forwarding sub-entry is a forwarding entry in a forwarding plane formed by the second communication node and a third communication node, and the third forwarding sub-entry includes BIER information of the third communication node.

In the case where the switching information is not switching, the BIER packet may be forwarded based on the BIER information of the third communication node in the first forwarding sub-entry. The first forwarding sub-entry may be considered as a forwarding entry of the second communication node when the switching information is not switching.

In the case where the switching information is switching, the BIER packet is transmitted based on the second forwarding sub-entry and the third forwarding sub-entry. The second forwarding sub-entry and the third forwarding sub-entry may be considered as forwarding entries of the second communication node when the switching information is switching.

In an embodiment, re-encapsulating the BIER packet based on the third forwarding sub-entry in the second forwarding entry includes the following.

A destination bit string in an outer-layer BIER header of the BIER packet is updated as a BFR-ID of the third communication node, where the BFR-ID of the third communication node is determined based on the third forwarding sub-entry in the second forwarding entry; and identification information of multicast traffic in the BIER packet is updated based on a first association relationship.

The destination bit string may be set as the BFR-ID of the third communication node when the BIER packet is updated, and the identification information of the multicast traffic is updated based on the first association relationship. For example, first identification information in the multicast traffic is updated as second identification information.

The first association relationship may be considered as an association relationship established by the second communication node.

In an embodiment, the method further includes the following.

The first association relationship is determined.

The timing for determining the first association relationship is not limited as long as the first association relationship can be determined when the BIER packet is transmitted. In the present application, the first association relationship may be determined when the second communication node needs to perform BIER forwarding plane switching.

In an embodiment, the method further includes the following.

Interest information sent by the third communication node is acquired; the interest information sent by the third communication node is transmitted to the first communication node; first identification information corresponding to the interest information and first indication information sent by the first communication node are acquired; in a case where the BIER forwarding plane includes the forwarding plane formed by the third communication node and the second communication node, second identification information of the interest information is determined, the second identification information and second indication information are sent to the third communication node, where the second indication information indicates that the second identification information is sent by the second communication node, and the first association relationship is determined based on the first identification information, the first indication information, the second identification information and the second indication information, where the first indication information indicates that the first identification information is sent by the first communication node; in a case where the BIER forwarding plane includes the forwarding plane formed after the BIER forwarding plane of the autonomous system to which the first communication node belongs extends onto the third communication node, the first identification information and the first indication information are sent to the third communication node.

In a case where the BIER forwarding plane switching is required, the second communication node may allocate the second identification information to the interest information and transmit the second identification information and the second indication information to the third communication node. The second communication node may determine the first association relationship based on the first identification information, the first indication information, the second identification information and the second indication information to facilitate re-encapsulating the BIER packet.

Figure 3:
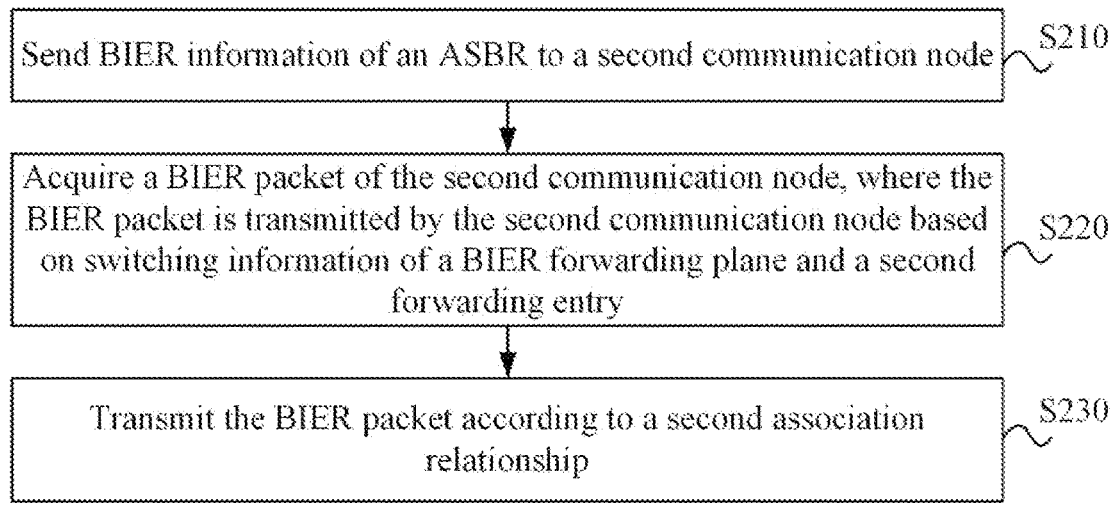
FIG. 3 is a flowchart of another multicast traffic transmission method according to the present application.

In an example implementation, the present application further provides a multicast traffic transmission method. FIG. 3 is a flowchart of another multicast traffic transmission method according to the present application. The method is applicable to a case of performing cross-domain multicast traffic transmission, and the method may be executed by a multicast traffic transmission apparatus configured at a third communication node provided in the present application. The apparatus may be implemented by software/hardware and integrated on the third communication node. An autonomous system to which the third communication node belongs may be located downstream of an autonomous system to which a first communication node belongs. The third communication node may be an ingress ASBR of an autonomous system to which the third communication node belongs. For the content that is not yet exhaustive in the embodiment, reference may be made to the preceding embodiments, which is not repeated here.

As shown in FIG. 3, the multicast traffic transmission method provided in the embodiment of the present application includes the following.

In S310, BIER information of an ASBR is sent to a second communication node.

In this step, the BIER information of the ASBR may be sent to the second communication node for a first communication node to determine a first forwarding entry, so as to achieve the transmission of a BIER packet.

In S320, a BIER packet of the second communication node is acquired, where the BIER packet is transmitted by the second communication node based on switching information of a BIER forwarding plane and a second forwarding entry.

In S330, the BIER packet is transmitted according to a second association relationship.

The second association relationship may be considered as an association relationship of a third communication node. The third communication node may transmit the BIER packet based on a third association relationship. Exemplarily, the BIER packet may be transmitted based on a cross-domain manner and the second association relationship. In a case where the cross-domain manner is Option B, the BIER packet is re-encapsulated based on the second association relationship, and then the re-encapsulated BIER packet is transmitted. In a case where the cross-domain manner is Option C, the BIER packet is directly forwarded based on an inner-layer BIER header, that is, the BIER packet with an outer-layer BIER header removed is transmitted.

According to the multicast traffic transmission method provided in the present application, the BIER information of the ASBR is sent to the second communication node; the BIER packet of the second communication node is acquired, where the BIER packet is transmitted by the second communication node based on the switching information of the BIER forwarding plane and the second forwarding entry; and the BIER packet is transmitted according to the second association relationship. Through this method, the application scenes of the BIER technology are enriched, and the application of the BIER technology in large-scale networks is achieved.

Based on the preceding embodiment, variant embodiments of the preceding embodiment are provided. For the brevity of description, only differences from the preceding embodiment are described in the variant embodiments.

In an embodiment, the BIER information of the ASBR includes BIER information of the third communication node.

In an embodiment, transmitting the BIER packet according to the second association relationship includes the following.

In a case where a routing prefix of the third communication node is routable in an autonomous system to which a first communication node belongs and a cross-domain manner is Option B, or in a case where a routing prefix of the third communication node is non-routable in an autonomous system to which a first communication node belongs and a cross-domain manner is Option B, the BIER packet is re-encapsulated based on the second association relationship and a BFR-ID of a fourth communication node, and the re-encapsulated BIER packet is transmitted; in a case where a routing prefix of the third communication node is routable in an autonomous system to which a first communication node belongs and a cross-domain manner is Option C, or in a case where a routing prefix of the third communication node is non-routable in an autonomous system to which a first communication node belongs and a cross-domain manner is Option C, an outer-layer BIER header of the BIER packet is removed, and a BIER packet with the outer-layer BIER header removed is transmitted.

Re-encapsulating the BIER packet may include updating identification information of multicast traffic and a destination bit string.

In an embodiment, re-encapsulating the BIER packet based on the second association relationship and the BFR-ID of the fourth communication node includes the following.

Identification information of multicast traffic in the BIER packet is updated based on the second association relationship; and a destination bit string in a header of the BIER packet is set as the BFR-ID of the fourth communication node.

In an embodiment, the method further includes the following.

The second association relationship is determined.

The timing for determining the second association relationship is not limited as long as the second association relationship can be determined when the BIER packet is transmitted. In the present application, the second association relationship may be determined after feedback information is received. The feedback information may be considered as first identification information and first indication information sent by the first communication node, or may be considered as second indication information and second identification information sent by the second communication node. In the present application, the second association relationship may be determined based on third identification information and third indication information determined for interest information by the third communication node and the feedback information.

In an embodiment, the method further includes the following.

Interest information sent by a fourth communication node is acquired; the interest information sent by the fourth communication node is transmitted to the second communication node; in a case where feedback information is received, third identification information of the interest information and third indication information are determined, and the third identification information and the third indication information are sent to the fourth communication node, where the third identification information includes a label or a segment identifier, and the third indication information indicates that the third identification information is sent by the third communication node; and in a case where the feedback information is first identification information and first indication information sent by a first communication node, the second association relationship is determined based on the first identification information, the first indication information, the third identification information and the third indication information; in a case where the feedback information is second identification information and second indication information sent by the second communication node, the second association relationship is determined based on the second identification information, the second indication information, the third indication information and the third indication information.

The third indication information may indicate that the third identification information is generated by the third communication node. The means for determining the third identification information is not limited. Identification information determined by each communication node for different pieces of traffic or VPNs to which the different pieces of traffic belong may not be the same.

The fourth communication node may send the interest information to the third communication node or the first communication node, then receive the first identification information and the first indication information sent by the first communication node, or receive the third identification information and the third indication information sent by the third communication node. The fourth communication node may establish an association relationship based on the received first identification information, the received first indication information and fourth identification information and fourth indication information allocated by the fourth communication node to the interest information, so that the BIER packet is transmitted based on the association relationship established by the fourth communication node after the BIER packet is received. The fourth identification information includes a label or a segment identifier. The fourth indication information may indicate that the fourth identification information is generated by the fourth communication node. Based on the association relationship established by the fourth communication node, transmitting the BIER packet may be determining a communication node interested in the multicast traffic based on the association relationship, and then forwarding the multicast traffic to the determined communication node.

In an embodiment, in a case where a routing prefix of the third communication node is routable in an autonomous system to which a first communication node belongs, the BIER forwarding plane includes a forwarding plane formed after a BIER forwarding plane of the autonomous system to which the first communication node belongs extends onto the third communication node; in a case where a routing prefix of the third communication node is non-routable in an autonomous system to which a first communication node belongs, the BIER forwarding plane includes a forwarding plane formed by the third communication node and the second communication node.

A multicast traffic transmission method provided in the present application is exemplarily described below. The multicast traffic transmission method provided in the present application may be considered as a method for achieving multicast domain crossing. When achieving BIER domain crossing, the related BIER technology can only adapt to the cross-domain scene of Option A, but cannot adapt to cross-domain scenes of Option B and Option C with more application values. The limitation in the application to cross-domain scenes will greatly limit the deployment of the BIER technology in actual networks, and advantages of the BIER technology cannot be fully used to achieve cross-domain multicast traffic transmission.

To give full play to the advantages of the BIER multicast, the present application proposes a method for achieving multicast domain crossing in conjunction with the BIER technology, so that the BIER technology is applicable to a variety of cross-domain scenes, and thus can be deployed and applied on a large scale.

First, a BFR-ID for indicating BIER forwarding and corresponding Sub-Domain (SD) information are allocated on a cross-domain ASBR.

In an embodiment, other information corresponding to the BFR-ID such as optional encapsulation information, that is, Bit Index Forwarding Table Identifier (BIFT-ID), and an optional Bit String Length (BSL) is allocated.

BFR-ID information of an ingress ASBR of a cross-domain downstream (close to the recipient direction) AS is advertised to an upstream ASBR by using BGP signaling extension along with a routing prefix of the ingress ASBR.

In a scene where the BFR-ID is uniformly allocated in the whole network, the BFR-ID allocated to the ASBR may be within the same SD as BFR-IDs of other nodes of the whole network, and no conflict exists between the BFR-ID allocated to the ASBR and the BFR-IDs of the other nodes. In a case where the BFR-ID is not uniformly allocated in the whole network, it is also required to ensure that BFR-IDs in the same forwarding plane are not in conflict. Therefore, ASBRs need to be distinguished from each other when participating in multiple forwarding planes, and the difference between the forwarding planes may be achieved by different SDs or other methods, which is not limited here. Values of the BFR-IDs may or may not be the same in different forwarding planes.

Figure 3A:
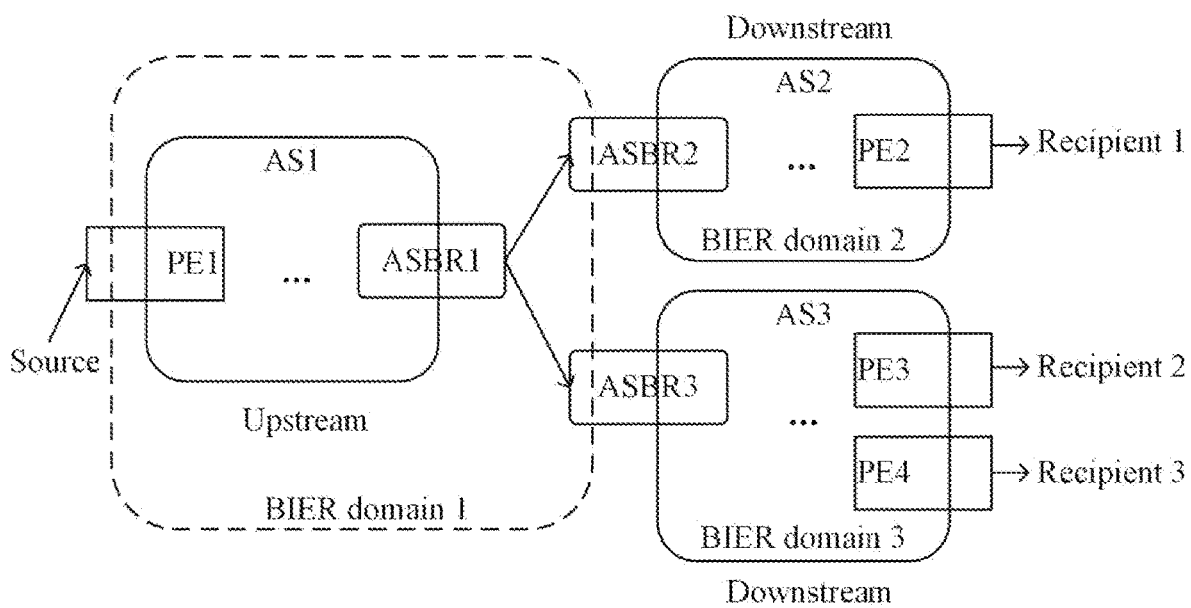
FIG. 3A is a diagram of another cross-domain network according to the present application.

In an embodiment, FIG. 3A is a diagram of another cross-domain network according to the present application. Referring to FIG. 3A, if a prefix of an ingress ASBR of a downstream AS (such as ASBR2/ASBR3 in FIG. 3A) is routable in an upstream AS (that is, higher-level AS1 closer to the source), an extending BIER domain including the upstream AS and downstream ASBRs may be established, in which case the BFR-ID allocated to the ASBR cannot be in conflict with the BFR-ID of the node in the upstream AS, as shown in FIG. 3A. Therefore, a BIER forwarding plane is formed, so that traffic can be encapsulated into a BIER packet at a PE connected to the source, directly forwarded to the downstream ASBR through the BIER, converted by the downstream ASBR through the BIER forwarding plane, and encapsulated with a new BIER header and delivered in the downstream AS to the recipient PE.

Figure 3B:
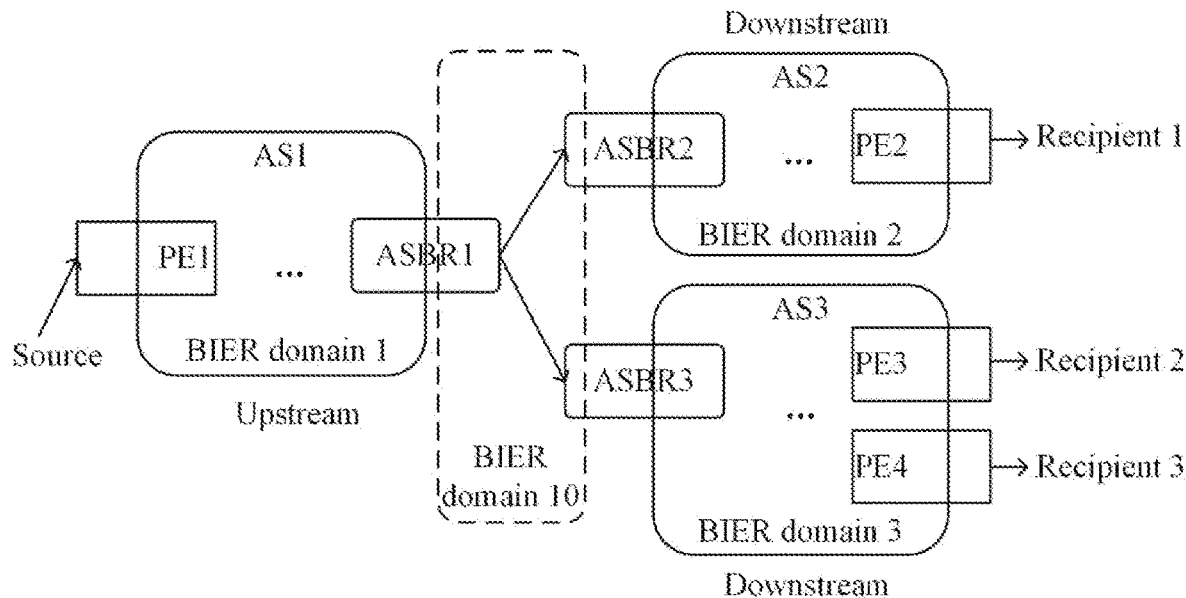
FIG. 3B is a diagram of another cross-domain network according to the present application.

In an embodiment, FIG. 3B is a diagram of another cross-domain network according to the present application. Referring to FIG. 3B, if a prefix of an ingress ASBR of a downstream AS is non-routable in an upstream AS, a separate BIER domain, such as BIER domain 10 shown in FIG. 3B, needs to be established on cross-domain ASBRs. At this time, a BFR-ID for indicating BIER forwarding, a corresponding SD, optional encapsulation information BIFT-ID and an optional BSL also need to be allocated to an egress ASBR in the upstream AS.

In an embodiment, BIER forwarding planes between ASBRs and forwarding planes independent of the upstream AS and the downstream AS may be distinguished by different SDs or in other manners, and BFR-IDs inside different forwarding planes cannot be the same.

Then, an ingress PE collects, through BGP signaling, information that an egress PE of the downstream AS or an ASBR is interested in a piece of traffic. In the cross-domain scene of Option B, the ingress PE learns, through BGP signaling, traffic information that an egress ASBR of the present domain wants to receive or the ingress ASBR of the downstream AS wants to receive. In the cross-domain scene of Option C, the ingress PE directly learns, through BGP signaling, traffic information that the egress PE of the downstream AS wants to receive.

In an embodiment, when the prefix of the ingress ASBR of the downstream AS is routable in the upstream AS, the egress ASBR of the upstream AS learns, through the BGP, the traffic information which the ingress ASBR of the downstream AS is interested in, that is, the interest information sent by the second communication node may be the traffic information which the ingress ASBR of the downstream AS is interested in.

In an embodiment, the ingress PE allocates a corresponding label or a device segment ID (SID), that is, the first identification information, to traffic which a downstream device is interested in, and notify the first identification information to the interested downstream device, which may be an ASBR device, or the egress PE device of the downstream AS, according to different cross-domain manners.

In an embodiment, the allocated device SID is for an IPv6 encapsulation scene. The SID may be a 128-bit structure having the same number of bits as an IPv6 address, may also having a function representing referring to an IPv4, IPv6 or layer 2 forwarding table, and may include parameters (that is, Arguments) representing a specific VPN or other information. The SID may be allocated to a VPN or to a piece of traffic in a VPN.

In an embodiment, BIER encapsulation is performed on traffic, that is, multicast traffic, so that the encapsulated traffic can be forwarded in an established BIER forwarding plane.

In an embodiment, in a case where the same forwarding plane established by the ingress ASBR of the downstream AS with the upstream AS is not the same forwarding plane in the whole network, the BFR-ID of the ingress ASBR of the downstream AS is carried in a BIER packet header encapsulated by the ingress PE.

In an embodiment, in the cross-domain scene of Option C, in a case where the BFR-ID is uniformly allocated in the whole network, that is, in a case where it is ensured that no BFR-ID conflict exists in the whole network, the ingress PE may also first encapsulate an inner-layer BIER header and adopt a corresponding encapsulation form, such as Ethernet, Multiprotocol Label Switching (MPLS) or IPv6, or directly adopt a BIER type. The BFR-ID information of the egress PE (such as PE2/PE3/PE4 in FIG. 3A) of the downstream AS is encapsulated in the BIER packet header. Then, a BIER header is further encapsulated on the outer layer, and the BFR-ID of the ingress ASBR of the downstream AS is carried. A protocol field in the outer-layer BIER header is filled with an outer-layer encapsulation protocol type indicating the inner-layer BIER header. If the inner-layer BIER header is encapsulated by using Ethernet, the protocol field in the outer-layer BIER header is filled with the Ethernet type; if the inner-layer BIER header is encapsulated by using MPLS, the protocol field in the outer-layer BIER header is filled with the MPLS type; if the inner-layer BIER header is encapsulated by using IPv6, the protocol field in the outer-layer BIER header is filled with the IPv6 type; if the inner-layer BIER header is directly encapsulated by using the BIER type without using other encapsulation forms, the protocol field in the outer-layer BIER header is filled with the BIER type. In an embodiment, in a case where the inner-layer BIER header is encapsulated by using IPv6, the filled IPv6 Destination Address (DA) is device SID information allocated by the ingress PE; in a case where the inner-layer BIER header is encapsulated by using MPLS, the label allocated by the ingress PE is carried.

In an embodiment, in a case where the ingress ASBR of the downstream AS cannot establish the same forwarding plane with the upstream AS, but can only establish a forwarding plane with the egress ASBR of the upstream AS, as shown in FIG. 3B, a destination bit string in the BIER packet encapsulated by the ingress PE is filled with in the BFR-ID of the egress ASBR of the upstream AS. When the encapsulated packet reaches the egress ASBR of the upstream AS, the corresponding BIER forwarding plane between ASBRs is switched to for the egress ASBR to perform forwarding.

In an embodiment, for different deployment scenes, automatic encapsulation conversion may be implemented when different BIER encapsulation forms are used in a next forwarding plane. As shown in FIG. 3B, the BIER forwarding plane in AS2 is composed of MPLS, and the BIER forwarding plane in AS3 is composed of Ethernet. When performing forwarding plane switching, the egress ASBR of the upstream AS may perform conversion according to a BIER forwarding plane encapsulation manner advertised by a downstream ASBR, so that the intercommunication problem caused by different encapsulation manners of the BIER forwarding planes of the whole network.

In an example, the ingress PE of the upstream AS may execute steps described below.

In a case where the prefix of the ingress ASBR of the downstream AS is routable within the upstream AS, that is, a Loopback address used by the ingress ASBR of the downstream AS for performing a BGP advertisement can be accessed within the upstream AS, the BIER forwarding plane that is only within the upstream AS may extends to the ingress ASBR of the downstream AS, that is, a BIER forwarding plane is established between the ingress PE of the upstream AS and the ingress ASBR of the downstream AS. The ingress PE of the upstream AS and BIER forwarding entries of other nodes in the upstream AS have forwarding entries of the ingress ASBR of the downstream AS.

In step 1, a label or SID information allocated by the ingress PE to a VPN or a piece of traffic is advertised, through the BGP, to the egress ASBR of the upstream AS, that, an interested ASBR.

No precedence exists for establishing the forwarding plane or allocating the traffic label or SID.

In step 2: the ingress PE performs one-layer or multiple-layer BIER encapsulation on traffic, that is, multicast traffic, sent by the source, such as a communication node upstream of the upstream AS, and performs forwarding through a BIER forwarding plane. When the ingress PE knows that the egress PE of the downstream AS needs to receive the traffic, in a case where the BFR-ID in the whole network is uniformly planned, a two-layer BIER packet header format may be used in encapsulation. The BFR-ID corresponding to the egress PE of the downstream AS is encapsulated in an inner-layer BIER header supplemented with corresponding outer-layer encapsulation such as Ethernet encapsulation, MPLS encapsulation, IPv6 encapsulation or BIER encapsulation, that is, further encapsulated with an outer-layer BIER header, where the destination bit string encapsulates the BFR-ID information of the ingress ASBR of the downstream AS.

In an example, the egress ASBR of the upstream AS may execute steps described below.

In a case where a route of the ingress ASBR of the downstream AS can be distributed to the upstream AS, the egress ASBR of the upstream AS participates in establishing a BIER forwarding plane between the ingress PE and the ingress ASBR of the downstream AS; in a case where the route of the ingress ASBR of the downstream AS cannot be distributed to the upstream AS, the egress ASBR of the upstream AS establishes a BIER forwarding plane with the ingress ASBR of the downstream AS alone.

In step 1, the egress ASBR of the upstream AS receives a BGP advertisement message, sent by the ingress ASBR of the downstream AS, of being interested in a piece of traffic. If the route of the ingress ASBR of the downstream AS can be accessed within the upstream AS, the next hop is not changed and is advertised to the ingress PE; if the route of the ingress ASBR of the downstream AS cannot be accessed within the upstream AS, the next hop is changed as the egress ASBR of the upstream AS, that is, the BFR-ID of the egress ASBR of the upstream AS is advertised to the ingress PE. When receiving a label or SID, sent by the ingress PE, allocated to a piece of traffic, the egress ASBR of the upstream AS allocates the label or SID and advertises the label or SID to the ingress ASBR of the downstream AS, information that the source PE is the ingress PE is carried, and an association relationship is generated.

No precedence exists for establishing the forwarding plane or allocating the label or SID information.

In step 2, when receiving a BIER packet from the upstream AS, the egress ASBR of the upstream AS determines whether to perform BIER forwarding plane switching processing. If switching is not required, forwarding is directly performed according to a BIER forwarding table; if BIER forwarding plane switching processing is required, the BIER forwarding plane established between the egress ASBR of the upstream AS and the ingress ASBR of the downstream AS is switched to for forwarding.

The means for determining whether to perform BIER forwarding plane switching processing may be determining whether a target bit string in the BIER packet is the BFR-ID of the present communication node, that is, the egress ASBR of the upstream AS, and determining the recipient based on the label or SID in the BIER packet so as to determine whether to perform forwarding plane switching.

In an example, the ingress ASBR of the downstream AS may execute steps described below.

The ingress ASBR of the downstream AS allocates a BFR-ID. If a route of the ingress ASBR of the downstream AS is reachable within the upstream AS, the ingress ASBR of the downstream AS establishes the same BIER forwarding plane with the upstream AS; if the route of the ingress ASBR of the downstream AS is not reachable within the upstream AS, the ingress ASBR of the downstream AS and the egress ASBR of the upstream AS establish separate BIER forwarding planes.

In step 1: the ingress ASBR of the downstream AS advertises a traffic interest advertisement received from the egress PE of the downstream AS to the egress ASBR of the upstream AS through the BGP; when a label or SID allocated to a piece of traffic by the upstream ASBR is received, a label or SID is allocated locally and sent to the egress PE of the downstream AS. The received label or SID is associated with the locally allocated label or SID.

No precedence exists for establishing the forwarding plane or allocating the traffic or SID.

In step 2, when receiving a BIER packet, the ingress ASBR of the downstream AS performs BIER forwarding plane switching according to the association relationship of the label or SID, and forwards the BIER packet to the corresponding recipient.

According to the multicast traffic transmission method provided in the present application, the deployment of the BIER technology in the whole network is completed, so that cross-domain scenes can also make full use of the multicast forwarding advantages of the BIER technology, and the application of the BIER technology is achieved in large-scale networks.

For convenience of description in the present application, AS1 serves as the upstream AS, where PE1 connected to the source serves as the ingress PE of the upstream AS, and ASBR1 serves as the egress ASBR of the upstream AS; AS2 and AS3 serve as downstream ASes, ASBR2 and ASBR3 serve as ingress ASBRs of the downstream Ass; PE2, PE3 and PE4 connected to recipients serve as egress PEs of the downstream ASs.

In an embodiment, it is assumed that the network shown in FIG. 3A is a cross-domain scene of Option B, first at the underlay level, it is assumed that the prefix of ASBR2 and the prefix of ASBR3 are routable in AS1, that is, devices in AS1 have routes reaching the prefix of ASBR2 and the prefix of ASBR3, ASBR2/ASBR3 may participate in AS1 establishing an extending BIER forwarding plane, that is, BIER domain 1, and BFR-IDs allocated to ASBR2/ASBR3 may not be the same as BFR-IDs of other nodes in AS1. It is assumed that the BFR-IDs allocated to ASBR2/ASBR3 are 21 and 31, information such as the BFR-IDs and SDs of ASBR2/ASBR3 is advertised to ASBR1 with a BGP prefix (this prefix is a routable prefix in AS1), and then ASBR1 delivers the prefix and BIER information to AS1 through the OSPF protocol, the ISIS protocol or other protocols in AS1. All devices in AS1, including PE1, will receive the BIER information, and establish a forwarding entry of BIER domain 1, including forwarding entries of BFR-ID 21 and BFR-ID 31 which can reach ASBR2/ASBR3.

AS2 and AS3 establish BIER forwarding planes of AS2 and AS3, that is, BIER domain 2 and BIER domain 3, respectively. Similarly, ASBR2/ASBR3 also have BFR-ID values in the respective BIER forwarding planes. BFR-ID values of ASBR2/ASBR3 have no association relationship with values in BIER domain 1, and these values may be the same or different. Therefore, planning the BFR-ID in the whole network or planning the BFR-ID according to domains does not matter at this time.

Figure 3C:
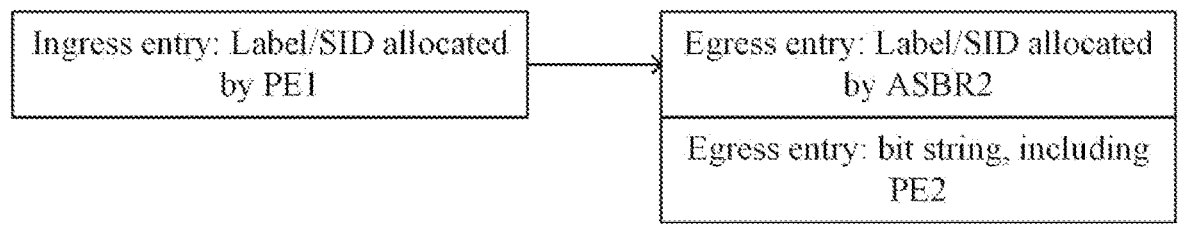
FIG. 3C is a diagram of a second association relationship according to the present application.
Figure 3D:
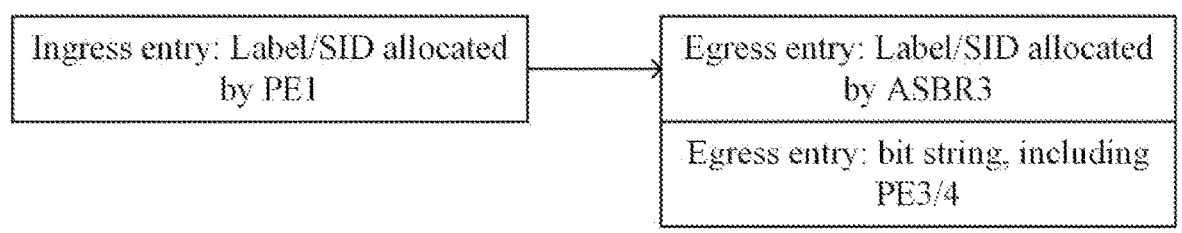
FIG. 3D is a diagram of another second association relationship according to the present application.

At the overlay level, PE2/PE3/PE4 deliver information of being interested in a piece of traffic, that is, the interest information sent by the fourth communication node, to ASBR2/ASBR3 through an MVPN extension of the BGP, ASBR2/ASBR3 advertise the received interest information to ASBR1, and ASBR1 advertises the received interest information to PE1, where the next hop is not changed and is still ASBR2/ASBR3. PE1 allocates a label or SID information for distinguishing to the traffic or a VPN to which the traffic belongs, and advertises the allocated label or SID information to ASBR1. ASBR1 advertises the label or SID information allocated by the PE to ASBR2/ASBR3 and information that the source PE is PE1 is carried. ASBR2/ASBR3 then advertises the route to PE2/PE3/PE4, respectively, the label or SID allocated by ASBR2/ASBR3 is carried, and the label advertised by ASBR1 is associated with a label allocated locally. FIG. 3C is a diagram of a second association relationship according to the present application, and FIG. 3D is a diagram of another second association relationship according to the present application. As shown in FIG. 3C and FIG. 3D, ASBR2/ASBR3 establish association relationships based on the locally allocated label and the label advertised by ASBR1. PE2/PE3/PE4 associate the label or SID allocated by ASBR2/ASBR3 with the recipient.

When the traffic, that is, the multicast traffic, enters PE1 for BIER encapsulation, PE1 encapsulates the label or SID information allocated to the traffic or the VPN to which the traffic belongs into an BIER header, and encapsulates BFR-ID information of ASBR2 and BFR-ID information of ASBR3 and BFR-ID information of PEs of other possible recipients in AS1 in a destination bit string, so as to obtain an BIER packet. The BIER packet is forwarded in AS1 through a first BIER forwarding table until reaching an ASBR1 device; and ASBR1 directly forwards the BIER packet to ASBR2/ASBR3 according to a second BIER forwarding table. ASBR2/ASBR3 re-encapsulate the BIER header according to the previously generated association entries, such as FIG. 3C and FIG. 3D, and a label or a SID allocated locally is carried; ASBR2 sets the BFR-ID of PE2 in the destination bit string, and ASBR3 sets the BFR-ID of PE3 and the BFR-ID of PE4 in the destination bit string. The BIER packet is forwarded through BIER forwarding in AS2 and AS3 and finally reaches PE2/PE3/PE4. PE2/PE3/PE4 identify the VPN corresponding the traffic or the specific traffic according to the label or SID allocated by ASBR2/ASBR3, strip off the BIER encapsulation and forward to the recipient.

In an embodiment, it is assumed that the network shown in FIG. 3A is a cross-domain scene of Option C where the BFR-ID is uniformly planned in the whole network, the premix of ASBR2 and the premix of ASBR3 are routable in AS1, but routes of PE2/PE3/PE4 are reachable only through ASBR2/ASBR3. That is, this is a scene where routes are not achieved in the whole network. An intermediate device (not a PE, not an ASBR) in the AS has no route to PE2/PE3/PE4. At the underlay level, ASBR2/ASBR3 may participate in AS1 establishing an extending BIER forwarding plane, that is, BIER domain 1. In addition, respective BIER forwarding planes are established in AS2 and AS3.

At the overlay level, due to cross-domain Option C, PE1 directly establishes a BGP neighbor relationship with PE2, PE3 and PE4, PE1 can directly learn that PE2/PE3/PE4 are interested in a piece of traffic, and PE1 allocates a label or SID information to the traffic or a VPN to which the traffic belongs and advertises the label or SID information to PE2/PE3/PE4 through the BGP. PE2/PE3/PE4 associate the label/SID information allocated by PE1 with the local recipient.

When the traffic enters PE1, BIER encapsulation is performed and a BIER packet is obtained, since the routes of PE2/PE3/PE4 are not visible in the intermediate node of AS1, PE1 performs two-layer BIER header encapsulation, an inner-layer destination bit string is set as BFR-IDs of PE2/PE3/PE4, and an outer-layer BIER header encapsulates BFR-IDs of ASBR2/ASBR3 into a bit string. The protocol in the outer-layer BIER header is determined according to the encapsulation form of the inner-layer BIER header carried behind, and the encapsulation form may be the Ethernet encapsulation form, the MPLS encapsulation form or the IPv6 encapsulation form, or may directly be the BIER type encapsulation form. The forwarding of the BIER packet in AS1 is performed according to the outer-layer BIER header until the BIER packet reaches ASBR2/ASBR3. ASBR2/ASBR3 strip off the outer-layer BIER header and forward the BIER packet according to the inner-layer BIER header until the BIER packet is forwarded to PE2/PE3/PE4. PE2/PE3/PE4 strip off the BIER header according to the association relationship generated at the overlay level and forwards the BIER packet to the required recipient.

In an embodiment, it is assumed that the network shown in FIG. 3B is a cross-domain scene of Option B where premixes of ASBR2/ASBR3 are non-routable in AS1, therefore, at the underlay level, in addition to BIER forwarding planes established in AS1, AS2 and AS3 respectively, an independent BIER forwarding plane needs to be established between ASBR1/ASBR2/ASBR3. At this time, whether the BFR-ID information is globally allocated or BFR-IDs of various forwarding plane do not matter. If the BFR-ID information is globally allocated, the BFR-ID allocated by ASBR1/ASBR2/ASBR3 is unique in the whole network. If the BFR-ID is allocated by each domain independently, ASBR1/ASBR2/ASBR3 may need to reallocate the BFR-ID in BIER domain 10. Therefore, four forwarding planes may exist in the scene shown in FIG. 3B, that is, BIER domain 1 of AS1, BIER domain 2 of AS2, BIER domain 3 of AS3 and BIER domain 10 composed of ASBRs.

Figure 3E:
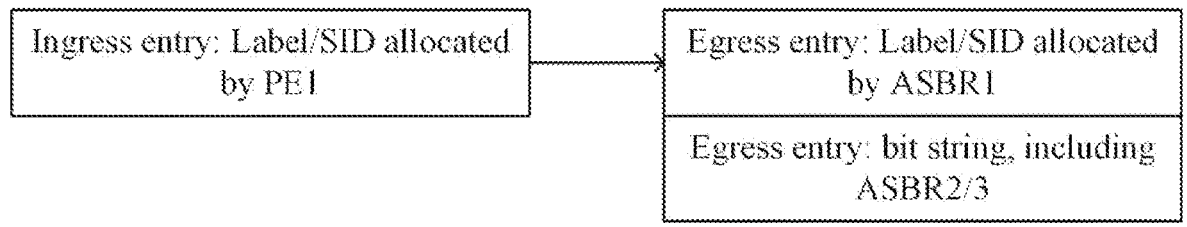
FIG. 3E is a diagram of a first association relationship according to the present application.

At the overlay level, ASBR2/ASBR3 notify ASBR1 of information of being interested in a piece of traffic, and ASBR1 notifies ingress PE1 of the information of being interested in the piece of traffic. PE1 allocates a corresponding label/SID to the traffic or a VPN to which the traffic belongs, and advertises the corresponding label/SID to ASBR1; and ASBR1 also allocates a label/SID to the traffic, and establishes an association relationship between the label/SID allocated by ASBR1 and the label/SID received from PE1. FIG. 3E is a diagram of a first association relationship according to the present application. As shown in FIG. 3E, ASBR1 establishes the first association relationship based on the label/SID sent by PE1 and the label/SID allocated by ASBR1. ASBR1 advertises the established first association relationship to ASBR2/ASBR3. ASBR2/ASBR3 also allocate a label/SID, establish an association relationship between the label/SID allocated by ASBR2/ASBR3 and the label/SID received from ASBR1, and advertise the association relationship to PE2/PE3/PE4, similar to FIG. 3C and FIG. 3D, except that the key is replaced with the label/SID allocated by ASBR1. PE2 associates the label/SID received from ASBR2 with the corresponding recipient, and similarly, PE3/PE4 associate the label/SID received from ASBR3 with the corresponding recipient.

When BIER encapsulation is performed on the traffic in PE1 and the BIER packet is obtained, PE1 encapsulates the BFR-ID of ASBR1 into a bit string of a BIER header, and forwards the BIER packet through the BIER forwarding plane in AS1. After the BIER packet reaches ASBR1 and the BIER header is stripped off, ASBR1 encapsulates a locally allocated label/SID according to the previously established association relationship, re-encapsulates a BIER header, and sets BFR-IDs of ASBR2/ASBR3 into a destination bit string. After the packet reaches ASBR2/ASBR3 and the BIER header is stripped off, a BIER header is re-encapsulated according to the previously established association relationship; ASBR2 sets the BFR-ID of PE2 into the destination bit string; and ASBR3 sets BFR-IDs of PE3/PE4 into the destination bit string, and the packet is forwarded to AS2 and AS3. The packet finally reaches PE2/PE3/PE4 through the BIER forwarding plane of AS2 and the BIER forwarding plane of AS3. After the BIER header is stripped off, PE2/PE3/PE4 forward the packet to the required recipient according to the previously established association relationship.

Figure 3F:
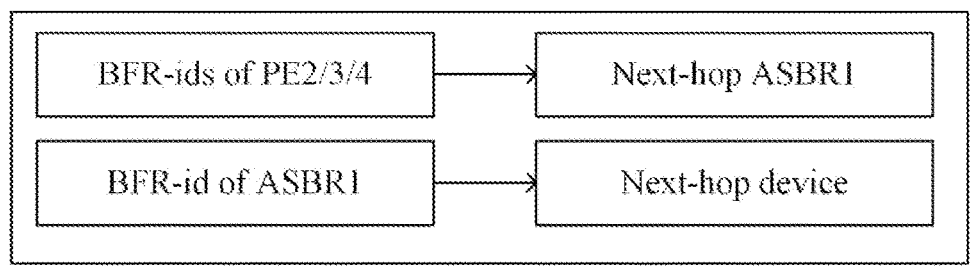
FIG. 3F is a diagram of a multi-level mapping relationship on a first communication node according to the present application.
Figure 3G:
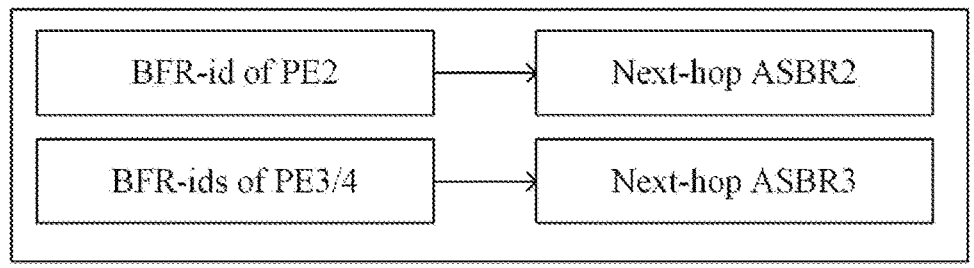
FIG. 3G is a diagram of a multi-level mapping relationship on a second communication node according to the present application.

In an embodiment, it is assumed that the network shown in FIG. 3B is a cross-domain scene of Option C where the BFR-ID is uniformly allocated in the whole network. Prefixes of PE2/PE3/PE4 are visible on ASBR1 and PE1 through a BGP advertisement, but are not visible on the intermediate device of AS1. Four independent BIER forwarding planes are established at the underlay level. When the advertisement is performed through the BGP on the PE and the ASBR, the allocated BFR-ID information is carried, thereby a multi-level mapping relationship between the BFR-ID and the next hop of the BGP is established. FIG. 3F is a diagram of a multi-level mapping relationship on a first communication node according to the present application. Referring to FIG. 3F, the multi-level mapping relationship is a multi-level mapping relationship of BFR-IDs on PE1, and it can be seen that the next hop of BFR-IDs of PE2/PE3/PE4 is ASBR1. FIG. 3G is a diagram of a multi-level mapping relationship on a second communication node according to the present application. As shown in FIG. 3G, the multi-level mapping relationship is a multi-level mapping table of BFR-IDs on ASBR1, and it can be seen that the next-hop and the BFR-ID of PE2 is ASBR2, and the next hop and the BFR-IDs of PE3/PE4 is ASBR3.

At the overlay level, since PE1 learns information that PE2/PE3/PE4 are interested in a piece of traffic directly through the multi-hop BGP from PE2/PE3/PE4, PE1 allocates a label/SID information to the traffic or a VPN to which the traffic belongs, and advertises the label/SID information to PE2/PE3/PE4. PE2/PE3/PE4 establish an association relationship between the label/SID information allocated by PE1 and the local recipient.

When the traffic enters PE1, BIER encapsulation is performed and a BIER packet is obtained, according to the iteration of the next hop of BGP routing, it can be obtained that the next hop going out to PE2/PE3/PE4 is ASBR1. Then, According to the established multi-level BFR-ID mapping table, PE1 performs two-layer BIER header encapsulation on the BIER packet. The label/SID information allocated by PE1 to the traffic is encapsulated in an inner-layer BIER header, and the BFR-IDs of PE2/PE3/PE4 are encapsulated into a destination bit string. An outer-layer BIER header encapsulates the BFR-ID of ASBR1 into a destination bit string. The outer-layer BIER header is coupled with the inner-layer BIER header in the manner of inner-layer encapsulation. The protocol in the outer-layer BIER header is set as a possible encapsulation form of the inner-layer BIER header, such as Ethernet, MPLS or IPv6, or a direct BIER type. After the packet is forwarded in AS1 according to the outer-layer BIER header and the packet reaches ASBR1, ASBR1 strips off the outer-layer BIER header and finds that it is required to iterate to ASBR2 and ASBR3 when processing the inner-layer BIER header; therefore ASBR1 may, optionally, encapsulates an outer-layer BIER header, and set the BFR-IDs of ASBR2/ASBR3 into a destination bit string. In a case where ASBR1 is directly connected to ASBR2/ASBR3, the outer-layer BIER header may also be omitted, and the BIER packet is directly forwarded to ASBR2/ASBR3. The encapsulation of the outer-layer BIER header is required in a case where multiple devices may exist between ASBR1 and ASBR2/ASBR3. When the packet reaches ASBR2/ASBR3, ASBR2/ASBR3 strip off the outer-layer BIER header and forward the packet according to the inner-layer BIER header until the BIER packet reaches PE2/PE3/PE4. PE2/PE3/PE4 remove the BIER header according to the association relationship established at the overlay level and forward the traffic to the recipient.

With the different deployment manners, the methods in the preceding various embodiments may be used independently or in combination, so that cross-domain scenes can also make full use of the multicast forwarding advantages of the BIER technology, and the application of the BIER technology is achieved in large-scale networks.

Figure 4:
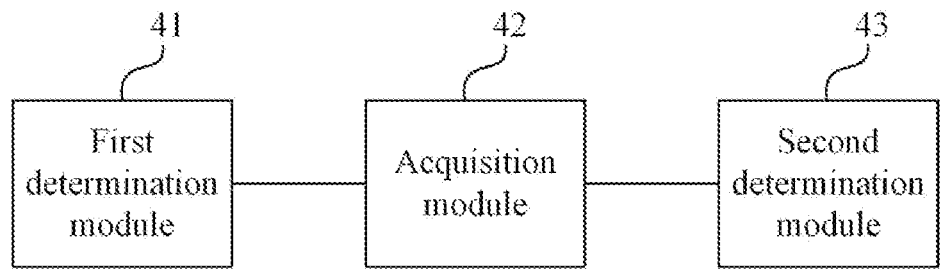
FIG. 4 is a structural diagram of a multicast traffic transmission apparatus according to the present application.

In an example implementation, the present application provides a multicast traffic transmission apparatus. FIG. 4 is a structural diagram of a multicast traffic transmission apparatus according to the present application. As shown in FIG. 4, the multicast traffic transmission apparatus provided in the present application may be configured at a first communication node. The apparatus includes a first determination module 41, an acquisition module 42 and a second determination module 43. The first determination module 41 is configured to determine a first forwarding entry, where the first forwarding entry includes Bit Indexed Explicit Replication (BIER) information of an Autonomous System Border Router (ASBR); the acquisition module 42 is configured to acquire multicast traffic; and the second determination module 43 is configured to encapsulate the multicast traffic based on the first forwarding entry, and determine and transmit a BIER packet.

The multicast traffic transmission apparatus provided in the embodiment is configured to implement the multicast traffic transmission method shown in FIG. 1. The multicast traffic transmission apparatus provided in the embodiment has implementation principles and technical effects similar to the multicast traffic transmission method shown in FIG. 1, which are not repeated here.

Based on the preceding embodiment, variant embodiments of the preceding embodiment are provided. For the brevity of description, only differences from the preceding embodiment are described in the variant embodiments.

In an embodiment, the BIER information of the ASBR includes one or more of: BIER information of a second communication node, where the second communication node is an egress ASBR of an autonomous system to which the first communication node belongs; BIER information of a third communication node, where an autonomous system to which the third communication node belongs is located downstream of an autonomous system to which the first communication node belongs; and BIER information of a fourth communication node, where the fourth communication node is an egress Provider Edge (PE) or an egress ASBR of an autonomous system to which a third communication node belongs.

In an embodiment, the BIER information includes a BFR-ID, and the BIER information further includes one or more of: sub-domain information, a bit index forwarding table identifier and a bit string length.

In an embodiment, the first determination module 41 is configured to perform one or more of the following.

BIER information of a second communication node and BIER information of a third communication node are acquired, and the first forwarding entry is determined based on the BIER information of the second communication node and the BIER information of the third communication node; BIER information of a second communication node is acquired, and the first forwarding entry is determined based on the BIER information of the second communication node; BIER information of a second communication node, BIER information of a third communication node and BIER information of a fourth communication node are acquired, and the first forwarding entry is determined based on the BIER information of the second communication node, the BIER information of the third communication node and the BIER information of the fourth communication node; and BIER information of a second communication node and BIER information of a fourth communication node are acquired, and the first forwarding entry is determined based on the BIER information of the second communication node and the BIER information of the fourth communication node.

In an embodiment, the acquisition module 42 transmitting the BIER packet includes the following.

The BIER packet is transmitted through a BIER forwarding plane of the first communication node, where the BIER forwarding plane of the first communication node is determined based on a routing capability of a routing prefix of a third communication node in an autonomous system to which the first communication node belongs.

In an embodiment, in a case where the routing prefix of the third communication node is routable in the autonomous system to which the first communication node belongs, the BIER forwarding plane includes a forwarding plane formed after a BIER forwarding plane of the autonomous system to which the first communication node belongs extends onto the third communication node; in a case where the routing prefix of the third communication node is non-routable in the autonomous system to which the first communication node belongs, the BIER forwarding plane includes a forwarding plane formed by the autonomous system to which the first communication node belongs and an autonomous system to which a second communication node belongs.

In an embodiment, in a case where the acquired multicast traffic is multicast traffic which a fourth communication node is interested in, a cross-domain manner is Option B, and a routing prefix of a third communication node is routable in an autonomous system to which the first communication node belongs, a destination bit string in a packet header of the BIER packet includes a BFR-ID of the third communication node; in a case where the acquired multicast traffic is multicast traffic which a fourth communication node is interested in, a cross-domain manner is Option C, and a routing prefix of a third communication node is routable in an autonomous system to which the first communication node belongs, two-layer packet header encapsulation is performed on the BIER packet, a destination bit string in an inner-layer BIER header includes a BFR-ID of the fourth communication node, a destination bit string in an outer-layer BIER header includes a BFR-ID of the third communication node, and a protocol field of the outer-layer BIER header is determined according to an encapsulation form of the inner-layer BIER header; in a case where the acquired multicast traffic is multicast traffic which a fourth communication node is interested in, a cross-domain manner is Option B, and a routing prefix of a third communication node is non-routable in an autonomous system to which the first communication node belongs, a destination bit string in a packet header of the BIER packet includes a BFR-ID of a second communication node; in a case where the acquired multicast traffic is multicast traffic which a fourth communication node is interested in, a cross-domain manner is Option C, and a routing prefix of a third communication node is non-routable in an autonomous system to which the first communication node belongs, two-layer packet header encapsulation is performed on the BIER packet, a destination bit string in an inner-layer BIER header includes a BFR-ID of the fourth communication node, a destination bit string in an outer-layer BIER header includes a BFR-ID of a second communication node, and a protocol field of the outer-layer BIER header is determined according to an encapsulation form of the inner-layer BIER header.

In an embodiment, the apparatus further includes a transmission module configured to perform the following.

Interest information sent by a receiving node is acquired, where the receiving node is a second communication node or a fourth communication node, and the interest information sent by the receiving node indicates multicast traffic which the fourth communication node is interested in or a virtual private network to which the multicast traffic belongs; and first identification information corresponding to the interest information and first indication information are sent to the receiving node, where the first identification information includes a label or a segment identifier, and the first indication information indicates that the first identification information is sent by the first communication node.

Figure 5:
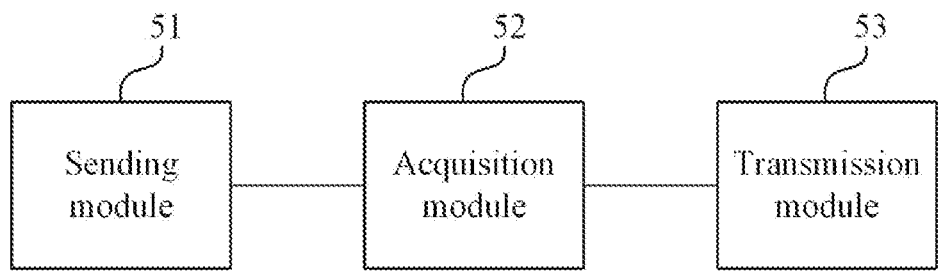
FIG. 5 is a structural diagram of a multicast traffic transmission apparatus according to the present application.

In an example implementation, the present application further provides a multicast traffic transmission apparatus. FIG. 5 is a structural diagram of a multicast traffic transmission apparatus according to the present application. As shown in FIG. 5, the multicast traffic transmission apparatus provided in the embodiment may be configured at a second communication node. The apparatus includes a sending module 51, an acquisition module 52 and a transmission module 53. The sending module 51 is configured to send BIER information of an ASBR to a first communication node; the acquisition module 52 is configured to acquire a BIER packet sent by the first communication node, where the BIER packet is determined based on a first forwarding entry, and the first forwarding entry is determined based on the BIER information of the ASBR sent to the first communication node; and the transmission module 53 is configured to transmit the BIER packet based on switching information of a BIER forwarding plane of the second communication node and a second forwarding entry.

The multicast traffic transmission apparatus provided in the embodiment is configured to implement the multicast traffic transmission method shown in FIG. 2. The multicast traffic transmission apparatus provided in the embodiment has implementation principles and technical effects similar to the multicast traffic transmission method shown in FIG. 2, which are not repeated here.

Based on the preceding embodiment, variant embodiments of the preceding embodiment are provided. For the brevity of description, only differences from the preceding embodiment are described in the variant embodiments.

In an embodiment, the BIER information of the ASBR includes one or more of: BIER information of the second communication node and BIER information of a third communication node.

In an embodiment, in a case where a routing prefix of a third communication node is routable in an autonomous system to which the first communication node belongs, the BIER forwarding plane includes a forwarding plane formed after a BIER forwarding plane of the autonomous system to which the first communication node belongs extends onto the third communication node, where the switching information of the BIER forwarding plane of the second communication node is not switching; in a case where a routing prefix of a third communication node is non-routable in an autonomous system to which the first communication node belongs, the BIER forwarding plane includes a forwarding plane formed by the second communication node and the first communication node and a forwarding plane formed by the third communication node and the second communication node, where the switching information of the BIER forwarding plane of the second communication node is switching.

In an embodiment, the transmission module 53 is configured to perform the following.

In a case where the switching information of the BIER forwarding plane of the second communication node is not switching, the BIER packet is forwarded according to a first forwarding sub-entry in the second forwarding entry, where the first forwarding sub-entry is a forwarding entry in a forwarding plane formed after a BIER forwarding plane of an autonomous system to which the first communication node belongs extends onto a third communication node, and the first forwarding sub-entry includes BIER information of the third communication node; in a case where the switching information of the BIER forwarding plane of the second communication node is switching, the BIER packet is received based on a second forwarding sub-entry in the second forwarding entry, the BIER packet is re-encapsulated based on a third forwarding sub-entry in the second forwarding entry, and the re-encapsulated BIER packet is transmitted, where the second forwarding sub-entry is a forwarding entry in a forwarding plane formed by the first communication node and the second communication node, the second forwarding entry includes BIER information of the second communication node, the third forwarding sub-entry is a forwarding entry in a forwarding plane formed by the second communication node and a third communication node, and the third forwarding sub-entry includes BIER information of the third communication node.

In an embodiment, the transmission module 53 re-encapsulating the BIER packet based on the third forwarding sub-entry in the second forwarding entry includes the following.

A destination bit string in an outer-layer BIER header of the BIER packet is updated as a BFR-ID of the third communication node, where the BFR-ID of the third communication node is determined based on the third forwarding sub-entry in the second forwarding entry; and identification information of multicast traffic in the BIER packet is updated based on a first association relationship.

In an embodiment, the apparatus further includes a determination module configured to perform the following.

The first association relationship is determined.

In an embodiment, the apparatus further includes a sending module configured to perform the following.

Interest information sent by the third communication node is acquired; the interest information sent by the third communication node is transmitted to the first communication node; first identification information corresponding to the interest information and first indication information sent by the first communication node are acquired; in a case where the BIER forwarding plane includes the forwarding plane formed by the third communication node and the second communication node, second identification information of the interest information is determined, the second identification information and second indication information are sent to the third communication node, where the second indication information indicates that the second identification information is sent by the second communication node, and the first association relationship is determined based on the first identification information, the first indication information, the second identification information and the second indication information, where the first indication information indicates that the first identification information is sent by the first communication node; in a case where the BIER forwarding plane includes the forwarding plane formed after the BIER forwarding plane of the autonomous system to which the first communication node belongs extends onto the third communication node, the first identification information and the first indication information are sent to the third communication node.

Figure 6:
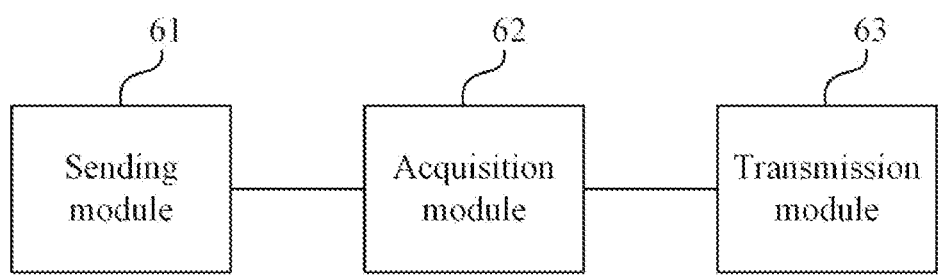
FIG. 6 is a structural diagram of a multicast traffic transmission apparatus according to the present application.

In an example implementation, the present application further provides a multicast traffic transmission apparatus. FIG. 6 is a structural diagram of a multicast traffic transmission apparatus according to the present application. As shown in FIG. 6, the multicast traffic transmission apparatus provided in the embodiment may be configured at a third communication node. The apparatus includes a sending module 61, an acquisition module 62 and a transmission module 63. The sending module 61 is configured to send BIER information of an ASBR to a second communication node; the acquisition module 62 is configured to acquire a BIER packet of the second communication node, where the BIER packet is transmitted by the second communication node based on switching information of a BIER forwarding plane and a second forwarding entry; and the transmission module 63 is configured to transmit the BIER packet according to a second association relationship.

The multicast traffic transmission apparatus provided in the embodiment is configured to implement the multicast traffic transmission method shown in FIG. 3. The multicast traffic transmission apparatus provided in the embodiment has implementation principles and technical effects similar to the multicast traffic transmission method shown in FIG. 3, which are not repeated here.

Based on the preceding embodiment, variant embodiments of the preceding embodiment are provided. For the brevity of description, only differences from the preceding embodiment are described in the variant embodiments.

In an embodiment, the BIER information of the ASBR includes BIER information of the third communication node.

In an embodiment, the transmission module 63 is configured to perform the following.

In a case where a routing prefix of the third communication node is routable in an autonomous system to which a first communication node belongs and a cross-domain manner is Option B, or in a case where a routing prefix of the third communication node is non-routable in an autonomous system to which a first communication node belongs and a cross-domain manner is Option B, the BIER packet is re-encapsulated based on the second association relationship and a BFR-ID of a fourth communication node, and the re-encapsulated BIER packet is transmitted and updated; in a case where a routing prefix of the third communication node is routable in an autonomous system to which a first communication node belongs and a cross-domain manner is Option C, or in a case where a routing prefix of the third communication node is non-routable in an autonomous system to which a first communication node belongs and a cross-domain manner is Option C, an outer-layer BIER header of the BIER packet is removed, and a BIER packet with the outer-layer BIER header removed is transmitted.

In an embodiment, the transmission module 63 re-encapsulating the BIER packet based on the second association relationship and the BFR-ID of the fourth communication node includes the following.

Identification information of multicast traffic in the BIER packet is updated based on the second association relationship; and a destination bit string in a header of the BIER packet is set as the BFR-ID of the fourth communication node.

In an embodiment, the apparatus further includes a determination module configured to perform the following.

The second association relationship is determined.

In an embodiment, the apparatus further includes a sending module configured to perform the following.

Interest information sent by a fourth communication node is acquired; the interest information sent by the fourth communication node is transmitted to the second communication node; in a case where feedback information is received, third identification information of the interest information and third indication information are determined, and the third identification information and the third indication information are sent to the fourth communication node, where the third identification information includes a label or a segment identifier, and the third indication information indicates that the third identification information is sent by the third communication node; and in a case where the feedback information is first identification information and first indication information sent by a first communication node, the second association relationship is determined based on the first identification information, the first indication information, the third identification information and the third indication information; in a case where the feedback information is second identification information and second indication information sent by the second communication node, the second association relationship is determined based on the second identification information, the second indication information, the third indication information and the third indication information.

In an embodiment, in a case where a routing prefix of the third communication node is routable in an autonomous system to which a first communication node belongs, the BIER forwarding plane includes a forwarding plane formed after a BIER forwarding plane of the autonomous system to which the first communication node belongs extends onto the third communication node; in a case where a routing prefix of the third communication node is non-routable in an autonomous system to which a first communication node belongs, the BIER forwarding plane includes a forwarding plane formed by the third communication node and the second communication node.

Figure 7:
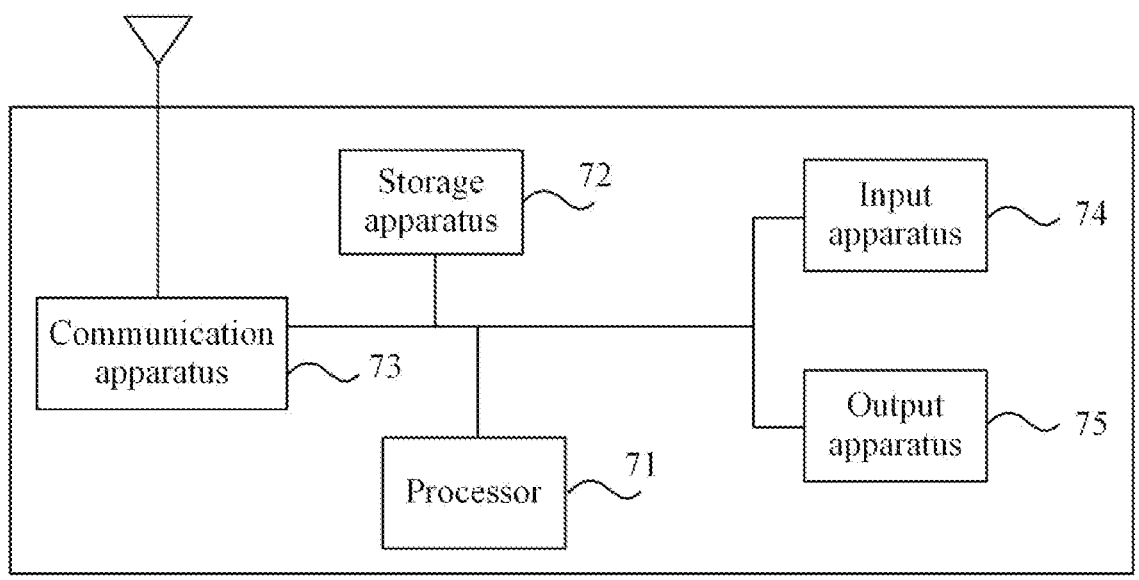
FIG. 7 is a structural diagram of a communication node according to the present application.

In an example implementation, FIG. 7 is a structural diagram of a communication node according to the present application. As shown in FIG. 7, the communication node provided in the present application includes one or more processors 71 and a storage apparatus 72. One or more processors 71 may be provided in the communication node. In FIG. 7, one processor 71 is used as an example. The storage apparatus 72 is configured to store one or more programs. The one or more programs are executed by the one or more processors 71 to cause the one or more processors 71 to implement the multicast traffic transmission method in the embodiments of the present application. When executing the multicast traffic transmission method described in FIG. 1, the communication node is a first communication node; when executing the multicast traffic transmission method described in FIG. 2, the communication node is a second communication node; and when executing the multicast traffic transmission described in FIG. 3, the communication node is a third communication node.

The communication node further includes a communication apparatus 73, an input apparatus 74 and an output apparatus 75.

The processor 71, the storage apparatus 72, the communication apparatus 73, the input apparatus 74 and the output apparatus 75 in the communication node may be connected via a bus or other means, with connection via the bus as an example in FIG. 7.

The input apparatus 74 may be configured to receive input digital or character information and generate key signal input related to user settings and function control of the communication node. The output apparatus 75 may include a display device such as a display screen.

The communication apparatus 73 may include a receiver and a sender. The communication apparatus 73 is configured to perform information transceiving communication under the control of the processor 71.

As a computer-readable storage medium, the storage apparatus 72 may be configured to store software programs and computer-executable programs and modules, such as program instructions/modules (for example, the first determination module 41, the acquisition module 42 and the second determination module 43 in the multicast traffic transmission apparatus; or the sending module 51, the acquisition module 52 and the transmission module 53 in the multicast traffic transmission apparatus; or the sending module 61, the acquisition module 62 and the transmission module 63 in the multicast traffic transmission apparatus) corresponding to the multicast traffic transmission method of the embodiments of the present application. The storage apparatus 72 may include a program storage region and a data storage region, where the program storage region may store an operating system and an application program required by at least one function while the data storage region may store data created depending on use of the communication node. Additionally, the storage apparatus 72 may include a high-speed random-access memory and may further include a nonvolatile memory, such as at least one disk storage device, a flash storage device, or another nonvolatile solid-state storage device. In some examples, the storage apparatus 72 may include memories which are remotely disposed with respect to the processor 71. These remote memories may be connected to the communication node via a network. Examples of the preceding network include, but are not limited to, the Internet, an intranet, a local area network, a mobile communication network and a combination thereof.

An embodiment of the present application further provides a storage medium. The storage medium stores a computer program which, when executed by a processor, implements any multicast traffic transmission method according to the embodiments of the present application, such as the multicast traffic transmission method applied to the first communication node, the multicast traffic transmission method applied to the second communication node and the multicast traffic transmission method applied to the third communication node.

The multicast traffic transmission method applied to the first communication node includes the following.

A first forwarding entry is determined, where the first forwarding entry includes BIER information of an ASBR; multicast traffic is acquired; and the multicast traffic is encapsulated based on the first forwarding entry, and a BIER packet is determined and transmitted.

The multicast traffic transmission method applied to the second communication node includes the following.

BIER information of an ASBR is sent to a first communication node; a BIER packet sent by the first communication node is acquired, where the BIER packet is determined based on a first forwarding entry, and the first forwarding entry is determined based on the BIER information of the ASBR sent to the first communication node; and the BIER packet is transmitted based on switching information of a BIER forwarding plane of the second communication node and a second forwarding entry.

The multicast traffic transmission method applied to the third communication node includes the following.

BIER information of an ASBR is sent to a second communication node; a BIER packet of the second communication node is acquired, where the BIER packet is transmitted by the second communication node based on switching information of a BIER forwarding plane and a second forwarding entry; and the BIER packet is transmitted according to a second association relationship.

A computer storage medium in the embodiment of the present application may adopt any combination of one or more computer-readable media. The computer-readable media may be computer-readable signal media or computer-readable storage media. The computer-readable storage medium may be, but is not limited to, an electrical, magnetic, optical, electromagnetic, infrared, or semiconductor system, apparatus or device, or any combination thereof. Examples of the computer-readable storage medium include (a non-exhaustive list): an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any suitable combination thereof. The computer-readable storage medium may be any tangible medium including or storing a program. The program may be used by or used in conjunction with an instruction execution system, apparatus, or device.

The computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable medium may send, propagate or transmit a program used by or used in conjunction with an instruction execution system, apparatus or device.

The program codes included on the computer-readable medium may be transmitted on any suitable medium including, but not limited to, a wireless medium, a wire, an optical cable, a radio frequency (RF), or any suitable combination thereof.

Computer program codes for performing the operations of the present application may be written in one or more programming languages or combination thereof, including object-oriented programming languages such as Java, Smalltalk, C++, as well as conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to the remote computer, the remote computer may be connected to the user computer via any kind of network including a local area network (LAN) or a wide area network (WAN), or may be connected to an external computer (for example, via the Internet through an Internet service provider).

Generally speaking, various embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for a local technical environment and may be implemented using any suitable data storage technology such as, but not limited to, a read-only memory (ROM), a random-access memory (RAM) or an optical storage device and system (a digital video disc (DVD) or a compact disc (CD)). Computer-readable media may include non-transitory storage media. The data processor may be of any type suitable for the local technical environment such as, but not limited to, a general-purpose computer, a special-purpose computer, a microprocessor, a digital signal processor (DSP), an application-specific integrated circuit (ASIC), a field-programmable gate array (FPGA), and a processor based on multi-core processor architecture.

What is claimed is:

1. A multicast traffic transmission method, applied to a first communication node, comprising:
   determining a first forwarding entry, wherein the first forwarding entry comprises bit indexed explicit replication (BIER) information of an autonomous system border router (ASBR);
   acquiring multicast traffic; and
   encapsulating the multicast traffic based on the first forwarding entry, and determining and transmitting a BIER packet,
   wherein an autonomous system to which a third communication node belongs is located downstream of an autonomous system to which the first communication node belongs and a fourth communication node is an egress provider edge (PE) or an egress ASBR of an autonomous system to which the third communication node belongs;
   wherein the acquired multicast traffic is multicast traffic which a fourth communication node is interested in, a cross-domain manner is Option C, two-layer packet header encapsulation is performed on a packet header of the BIER packet, a destination bit string in an inner-layer BIER header comprises a BFR-ID of the fourth communication node, a destination bit string in an outer-layer BIER header comprises a BFR-ID of the third communication node, and a protocol field of the outer-layer BIER header is determined according to an encapsulation form of the inner-layer BIER header.

2. The method according to claim 1, wherein the BIER information of the ASBR comprises at least one of: BIER information of a second communication node, wherein the second communication node is an egress ASBR of an autonomous system to which the first communication node belongs; BIER information of a third communication node; or BIER information of a fourth communication node; wherein the BIER information comprises a bit-forwarding router identifier (BFR-ID) and at least one of: sub-domain information, a bit index forwarding table identifier or a bit string length.

3. The method according to claim 1, wherein transmitting the BIER packet comprises:
transmitting the BIER packet through a BIER forwarding plane of the first communication node, wherein the BIER forwarding plane of the first communication node is determined based on a routing capability of a routing prefix of a third communication node in an autonomous system to which the first communication node belongs.

4. The method according to claim 3, wherein
in a case where the routing prefix of the third communication node is routable in the autonomous system to which the first communication node belongs, the BIER forwarding plane comprises a forwarding plane formed after a BIER forwarding plane of the autonomous system to which the first communication node belongs extends onto the third communication node;
in a case where the routing prefix of the third communication node is non-routable in the autonomous system to which the first communication node belongs, the BIER forwarding plane comprises a forwarding plane formed by an autonomous system to which the first communication node and a second communication node belong.

5. The method according to claim 1, further comprising:
acquiring interest information sent by a receiving node, wherein the receiving node is a second communication node or a fourth communication node, and the interest information sent by the receiving node indicates multicast traffic which the fourth communication node is interested in or a virtual private network to which the multicast traffic belongs; and
sending first identification information and first indication information which are corresponding to the interest information to the receiving node, wherein the first identification information comprises a label or a segment identifier, and the first indication information indicates that the first identification information is sent by the first communication node.

6. The method according to claim 1, wherein determining the first forwarding entry comprises at least one of:
acquiring BIER information of a second communication node and BIER information of a third communication node, and determining the first forwarding entry based on the BIER information of the second communication node and the BIER information of the third communication node;
acquiring BIER information of a second communication node, and determining the first forwarding entry based on the BIER information of the second communication node;
acquiring BIER information of a second communication node, BIER information of a third communication node and BIER information of a fourth communication node, and determining the first forwarding entry based on the BIER information of the second communication node, the BIER information of the third communication node and the BIER information of the fourth communication node; or
acquiring BIER information of a second communication node and BIER information of a fourth communication node, and determining the first forwarding entry based on the BIER information of the second communication node and the BIER information of the fourth communication node.

7. A non-transitory storage medium storing a computer program which, when executed by a processor, implements the multicast traffic transmission method according to claim 1.

8. A multicast traffic transmission method, applied to a second communication node, comprising:
sending bit indexed explicit replication (BIER) information of an autonomous system border router (ASBR) to a first communication node;
acquiring a BIER packet sent by the first communication node, wherein the BIER packet is determined based on a first forwarding entry, and the first forwarding entry is determined based on the BIER information of the ASBR sent to the first communication node; and
transmitting the BIER packet based on switching information of a BIER forwarding plane of the second communication node and a second forwarding entry;
wherein the second communication node is an egress ASBR of an autonomous system to which the first communication node belongs and an autonomous system to which a third communication node belongs is located downstream of an autonomous system to which the first communication node belongs;
in a case where a routing prefix of a third communication node is routable in an autonomous system to which the first communication node belongs, the BIER forwarding plane of the second communication node comprises a forwarding plane formed after a BIER forwarding plane of the autonomous system to which the first communication node belongs extends onto the third communication node, the switching information of the BIER forwarding plane of the second communication node is not switching;
in a case where a routing prefix of a third communication node is non-routable in an autonomous system to which the first communication node belongs, the BIER forwarding plane of the second communication node comprises a forwarding plane formed by the second communication node and the first communication node and a forwarding plane formed by the third communication node and the second communication node, the switching information of the BIER forwarding plane of the second communication node is switching.

9. The method according to claim 8, wherein the BIER information of the ASBR comprises at least one of: BIER information of the second communication node or BIER information of a third communication node.

10. A multicast traffic transmission method, applied to a third communication node, comprising:
sending bit indexed explicit replication (BIER) information of an autonomous system border router (ASBR) to a second communication node;
acquiring a BIER packet of the second communication node, wherein the BIER packet is transmitted by the second communication node based on switching information of a BIER forwarding plane and a second forwarding entry; and transmitting the BIER packet according to a second association relationship;

wherein the BIER information of the ASBR comprises BIER information of the third communication node;

wherein an autonomous system to which a third communication node belongs is located downstream of an autonomous system to which a first communication node belongs;

wherein transmitting the BIER packet according to the second association relationship comprises:

in a case where a routing prefix of the third communication node is routable in an autonomous system to which a first communication node belongs and a cross-domain manner is Option C, or in a case where a routing prefix of the third communication node is non-routable in an autonomous system to which a first communication node belongs and a cross-domain manner is Option C, removing an outer-layer BIER header of the BIER packet, and transmitting the BIER packet with the outer-layer BIER header removed.

11. The method according to claim 10, further comprising one of:

determining the second association relationship; or acquiring interest information sent by a fourth communication node;

transmitting the interest information sent by the fourth communication node to the second communication node;

in a case where feedback information is received, determining third identification information of the interest information and third indication information, and sending the third identification information and the third indication information to the fourth communication node, wherein the third identification information comprises a label or a segment identifier, and the third indication information indicates the third identification information and the third indication information is sent by the third communication node;

in a case where the feedback information is first identification information and first indication information which are sent by a first communication node, determining the second association relationship based on the first identification information, the first indication information, the third identification information and the third indication information; and in a case where the feedback information is second identification information and second indication information which are sent by the second communication node, determining the second association relationship based on the second identification information, the second indication information, the third identification information and the third indication information.

12. The method according to claim 10, wherein in a case where a routing prefix of the third communication node is routable in an autonomous system to which a first communication node belongs, the BIER forwarding plane comprises a forwarding plane formed after a BIER forwarding plane of the autonomous system to which the first communication node belongs extends onto the third communication node;

in a case where a routing prefix of the third communication node is non-routable in an autonomous system to which a first communication node belongs, the BIER forwarding plane comprises a forwarding plane formed by the third communication node and the second communication node.

13. A multicast traffic transmission apparatus configured at a first communication node, comprising at least one processor; and a storage apparatus configured to store at least one program;

wherein the at least one program, when executed by the at least one processor, causes the at least one processor to implement the multicast traffic transmission method according to claim 1.

14. A multicast traffic transmission apparatus configured at a second communication node, comprising at least one processor; and a storage apparatus configured to store at least one program;

wherein the at least one program, when executed by the at least one processor, causes the at least one processor to implement the multicast traffic transmission method according to claim 8.

15. A multicast traffic transmission apparatus configured at a third communication node, comprising at least one processor; and a storage apparatus configured to store at least one program;

wherein the at least one program, when executed by the at least one processor, causes the at least one processor to implement the multicast traffic transmission method according to claim 10.

* * * * *